United States Patent
Lin et al.

(10) Patent No.: US 11,091,567 B2
(45) Date of Patent: Aug. 17, 2021

(54) AMIDO-BENZOQUINONE CATALYST SYSTEMS AND PROCESSES THEREOF

(71) Applicant: ExxonMobil Chemical Patents Inc., Baytown, TX (US)

(72) Inventors: Tzu-Pin Lin, Seabrook, TX (US); Lubin Luo, Houston, TX (US); Alex E. Carpenter, Houston, TX (US); Gursu Culcu, Houston, TX (US); Catherine A. Faler, Houston, TX (US); Irene C. Cai, Webster, TX (US); John R. Hagadorn, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/816,507

(22) Filed: Mar. 12, 2020

(65) Prior Publication Data

US 2020/0325254 A1 Oct. 15, 2020

Related U.S. Application Data

(60) Provisional application No. 62/833,927, filed on Apr. 15, 2019.

(51) Int. Cl.
| | |
|---|---|
| *C08F 4/60* | (2006.01) |
| *C08F 10/02* | (2006.01) |
| *C08F 2/34* | (2006.01) |
| *C08F 4/02* | (2006.01) |

(52) U.S. Cl.
CPC ............ *C08F 4/60048* (2013.01); *C08F 2/34* (2013.01); *C08F 4/025* (2013.01); *C08F 10/02* (2013.01)

(58) Field of Classification Search
CPC ............................ C08F 4/60048; C08F 10/02
See application file for complete search history.

(56) References Cited

U.S. PATENT DOCUMENTS

| | | | |
|---|---|---|---|
| 6,175,409 B1 | 1/2001 | Nielsen et al. | 356/337 |
| 6,260,407 B1 | 7/2001 | Petro et al. | 73/61.52 |
| 6,294,388 B1 | 9/2001 | Petro | 436/8 |
| 6,306,658 B1 | 10/2001 | Turner et al. | 436/37 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,455,316 B1 | 9/2002 | Turner et al. | 436/37 |
| 6,461,515 B1 | 10/2002 | Safir et al. | 210/656 |
| 6,475,391 B2 | 11/2002 | Safir et al. | 210/656 |
| 6,489,168 B1 | 12/2002 | Wang et al. | 436/37 |
| 6,491,816 B2 | 12/2002 | Petro | 210/198.2 |
| 6,491,823 B1 | 12/2002 | Safir et al. | 210/656 |
| 2010/0029469 A1* | 2/2010 | Wang | C08F 10/00 502/117 |
| 2017/0291973 A1 | 10/2017 | Munro et al. | C08F 210/16 |

FOREIGN PATENT DOCUMENTS

| | | | |
|---|---|---|---|
| CN | 106349294 A | 1/2017 | ............. C07F 15/00 |
| CN | 107641164 A | 1/2018 | ............. C08F 110/02 |
| CN | 107955088 A * | 4/2018 | |
| CN | 107955088 A | 4/2018 | ............. C08F 110/02 |
| WO | 2000/009255 | 2/2000 | ............. B01J 19/00 |
| WO | 2001/092342 | 12/2001 | ............. C08F 4/70 |
| WO | 2010/073382 | 7/2010 | ............. C08F 32/04 |

OTHER PUBLICATIONS

Machine translation of CN 107955088. (Year: 2018).*
Cheng, H. et al. (2018) "(Anilino)anthraquinone Nickel-Catalyzed Random Copolymerization of Norbornene and Ethylene," *ChemCatChem*, v. 10(3), pp. 497-500.
Fu, X et al. (2017) "Highly Robust Nickel Catalysts Containing Anilinonaphthoquinone Ligand for Copolymerization of Ethylene and Polar Monomers," *Macromolecules*, v.50(23), pp. 9216-9221.
Murphy, V. et al. (2003) "A Fully Integrated High-Throughput Screening Methodology for the Discovery of New Polyolefin Catalysts: Discovery of a New Class of High Temperature Single-Site Group (IV) Copolymerization Catalysts," J. Am. Chem. Soc., v.125, pp. 4306-4317.
Okada, M. et al. (2006) "Ethylene Polymerization with an Anilinonaphthoquinone-Ligated Nickel Complex," *Studies in Surface Science and Catalysis*, v.161, pp. 171-174.
Okada, M. (2006) "Synthesis of Uniquely Branched Polyethylene by Anilinonaphthoquinone Ligated Nickel Complex Activated with Tris(pentafluorophenyl)borane," *Macromolecular Rapid Communications*, v.27(17), pp. 1418-1423.
Okada, M. et al. (2007) "Synthesis Of Anilinonaphthoquinone-Based Nickel Complexes and Their Application for Olefin Polymerization," J. of Organomet. Chem., v.692(23), pp. 5183-5189.
Okada, M. et al. (2014) "Heterogenization of an Anilinonaphthoquinone-Chelated Nickel Complex for Ethylene Polymerization Using Silica-Supported Modified Methylaluminoxane," *Macromolecular Chem. and Phys.*, v.215(18), pp. 1792-1796.
Okada, M. et al. (2015) "Highly Soluble Polynorbornene Prepared by an Anilinonaphthoquinone-Ligated Nickel Complex via Coordination-Insertion Polymerization," J. of Organomet. Chem., v.798(2), pp. 384-387.

* cited by examiner

Primary Examiner — Catherine S Branch

(57) ABSTRACT

The present disclosure relates to amido-benzoquinone transition metal complexes, catalyst systems including amido-benzoquinone transition metal complexes, and polymerization processes to produce polyolefin polymers such as polyethylene-based polymers and polypropylene-based polymers.

27 Claims, No Drawings

AMIDO-BENZOQUINONE CATALYST SYSTEMS AND PROCESSES THEREOF

CROSS REFERENCE TO RELATED APPLICATIONS

This application claims the priority benefit of Provisional Application No. 62/833,927, filed Apr. 15, 2019, the disclosure of which is incorporated herein by reference.

FIELD

The present disclosure relates to amido-benzoquinone transition metal complexes, catalyst systems including amido-benzoquinone transition metal complexes, and polymerization processes to produce polyolefin polymers such as polyethylene-based polymers and polypropylene-based polymers.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of polymers having improved properties.

Polyolefins, such as polyethylene, often have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those using a Ziegler-Natta catalyst, a transition metal based catalyst, or a metallocene catalyst.

Additionally, pre-catalysts (neutral, unactivated complexes) should be thermally stable at and above ambient temperature, as they are often stored for weeks before being used. The performance of a given catalyst is closely influenced by the reaction conditions, such as the monomer concentrations and temperature. For instance, the solution process, which benefits from being run at temperatures above 120° C., is particularly challenging for catalyst development. At such high reactor temperatures, it is often difficult to maintain high catalyst activity and high molecular weight capability as both attributes quite consistently decline with an increase of reactor temperature. With a wide range of polyolefin products desired, from high density polyethylene (HDPE) to elastomers (e.g., thermoplastic elastomers (TPE); ethylene-propylene-diene monomer terpolymers (EPDM)), many different catalyst systems may be needed, as it is unlikely that a single catalyst will be able to address all the needs for the production of these various polyolefin products. The strict set of requirements needed for the development and production of new polyolefin products makes the identification of suitable catalysts for a given product and production process a highly challenging endeavor.

Furthermore, while group 8, 9, and 10 transition metals are abundant and inexpensive, they are uncommon in olefin polymerization catalysts. The lack of use may relate to catalyst design with poor activity or the need to use large excess of activator (e.g., methylalumoxane at 100+:1 molar ratios to catalyst) in order to reduce active site deactivation.

Fu, X et al. (2017) "Highly Robust Nickel Catalysts Containing Anilinonaphthoquinone Ligand for Copolymerization of Ethylene and Polar Monomers," *Macromolecules*, v.50(23), pp. 9216-9221 and CN 107641164A disclose that

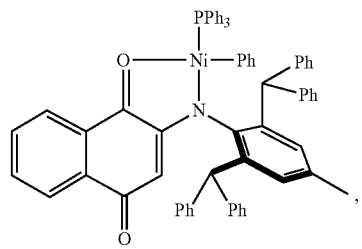

in combination with 100-1,000 equivalent of trialkylaluminum-free dried modified methylalumoxane exhibited activities of 1,000-5,000 kg mol$^{-1}$ h$^{-1}$ for ethylene polymerization.

There is a need for new and improved catalysts, catalyst systems, and processes for the polymerization of olefins in order to achieve high catalyst activity with less activator usage. Furthermore, there is still a need to develop highly active catalysts capable of operating at high reactor temperatures while producing polymers with high molecular weights (e.g., catalysts with high stability and good activity at high polymerization temperatures).

References of interest include: CN107641164A; CN107955088A; CN106349294A; US 2017/0291973; WO2010/073382; Cheng, H. et al. (2018) "(Anilino)anthraquinone Nickel-Catalyzed Random Copolymerization of Norbornene and Ethylene," *ChemCatChem*, v.10(3), pp. 497-500; Fu, X. et al. (2017) "Highly Robust Nickel Catalysts Containing Anilinonaphthoquinone Ligand for Copolymerization of Ethylene and Polar Monomers," *Macromolecules*, v.50(23), pp 9216-9221; Okada, M. et al. (2015) "Highly Soluble Polynorbornene Prepared by an Anilinonaphthoquinone-Ligated Nickel Complex via Coordination-Insertion Polymerization," *J. of Organomet. Chem.*, v.798 (2), pp. 384-387; Okada, M. et al. (2014) "Heterogenization of an Anilinonaphthoquinone-Chelated Nickel Complex for Ethylene Polymerization Using Silica-Supported Modified Methylaluminoxane," *Macromolecular Chem. and Phys.*, v.215(18), pp. 1792-1796; Okada, M. et al. (2006) "Ethylene Polymerization with an Anilinonaphthoquinone-Ligated Nickel Complex," *Studies in Surface Science and Catalysis*, v.161, pp. 171-174; Okada, M. et al. (2007) "Synthesis Of Anilinonaphthoquinone-Based Nickel Complexes and Their Application for Olefin Polymerization," *J. of Organomet. Chem.*, v.692(23), pp. 5183-5189; Okada, M. (2006) "Synthesis of Uniquely Branched Polyethylene by Anilinonaphthoquinone Ligated Nickel Complex Activated with Tris (pentafluorophenyl)borane," *Macromolecular Rapid Communications*, v.27(17), pp. 1418-1423.

SUMMARY

The present disclosure relates to catalyst systems including a catalyst compound and an activator, where the catalyst compound is represented by Formula (I):

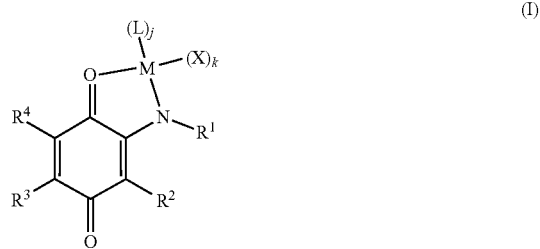

where:
M is a group 8, 9, or 10 transition metal;
L is a Lewis base;
j is 0, 1, or 2;
X is an anionic ligand;
k is 0, 1, or 2;
and,
$R^1$, $R^2$, $R^3$, and $R^4$ are independently selected from hydrogen, substituted or unsubstituted $C_1$-$C_{30}$ hydrocarbyl, —CN, —NR'$_2$, —OR', halogen, —NO$_2$, —SiR'$_3$, five-, six-, or seven-membered heterocyclyl (where each R' is independently hydrogen, $C_1$-$C_{30}$ hydrocarbyl, and R' is optionally substituted by halogen, or two R' radicals optionally bond to form a five- or six-membered ring), or —SiR"$_3$, —SiR"$_2$(OR'), —SiR"(OR')$_2$, or —Si(OR')$_3$ (where each R" and R'" is independently hydrogen, $C_1$-$C_{30}$ hydrocarbyl, or two R" radicals optionally bond to form a five- or six-membered ring);
where $R^1$, $R^2$, $R^3$, and $R^4$ are optionally substituted by halogen, —NO$_2$, —CN, —CF$_3$, —CF$_2$CF$_3$, —CH$_2$CF$_3$, —NR'$_2$, —OR', —OSi(OR')$_3$, where each R' is independently hydrogen, $C_1$-$C_{30}$ hydrocarbyl, and R' is optionally substituted by halogen, or two R' radicals optionally bond to form a five- or six-membered ring, or —SiR"$_3$ where each R" is independently hydrogen, $C_1$-$C_{30}$ hydrocarbyl, or two R" radicals optionally bond to form a five- or six-membered ring; and
the activator is represented by Formula (II):

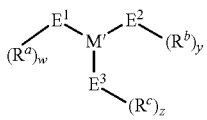

(II)

where:
M' is selected from boron, aluminum, or gallium;
$E^1$, $E^2$, and $E^3$ are independently selected from oxygen, nitrogen, phosphorus, sulfur or halogen;
$R^a$, $R^b$, and $R^c$ are independently selected from a $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 30 carbon atoms, alkylaryl where alkyl has from 1 to 10 carbon atoms and aryl has from 6 to 30 carbon atoms, a support material, or two or more of $R^a$, $R^b$, and $R^c$ are optionally bonded to form a five-, six- or seven-membered carbocyclic or heterocyclic ring, the heterocyclic ring comprising at least one atom from the group consisting of N, P, O and S;
where $R^a$, $R^b$, and $R^c$ are optionally substituted by halogen, —NO$_2$, —CF$_3$, —CF$_2$CF$_3$, —CH$_2$CF$_3$, —NR'$_2$, —OR' (where each R' is independently hydrogen, $C_1$-$C_{22}$-hydrocarbyl, and R' is optionally substituted by halogen, or two R' radicals optionally bond to form a five- or six-membered ring), or —SiR"$_3$ (where each R" is independently hydrogen, $C_1$-$C_{22}$-hydrocarbyl, or two R" radicals optionally bond to form a five- or six-membered ring);
w is 0 if $E^1$ is a halogen, y is 0 if $E^2$ is a halogen, and z is 0 if $E^3$ is a halogen;
w is 1 if $E^1$ is oxygen or sulfur and w is 2 if E is nitrogen or phosphorus;
y is 1 if $E^2$ is oxygen or sulfur and y is 2 if $E^2$ is nitrogen or phosphorus; and
z is 1 if $E^3$ is oxygen or sulfur and z is 2 if $E^3$ is nitrogen or phosphorus.

In yet another embodiment, the present disclosure provides a catalyst system including an activator, a catalyst support, and a catalyst of the present disclosure.

In still another embodiment, the present disclosure provides a polymerization process including contacting one or more olefin monomers with a catalyst system of the present disclosure.

In still another embodiment, the present disclosure provides a polyolefin formed by a catalyst system and or method of the present disclosure.

DETAILED DESCRIPTION

The present disclosure relates to amido-benzoquinone transition metal catalyst systems for polymerization of olefins. The catalyst systems include an amido-benzoquinone transition metal catalyst compound and an activator, and may be supported. It has been discovered that catalyst systems including a group 8, 9, or 10 transition metal and an aryloxymetal activator may have higher activity in the polymerization of ethylene and reduced activator usage when compared to other late transition metal catalyst systems.

Catalyst systems and methods of the present disclosure can provide formation of polymers having high molecular weights and the ability to make an increased amount of polymer in a given reactor, as compared to conventional catalysts. Catalyst systems and methods of the present disclosure can provide highly active catalysts capable of operating at high reactor temperatures with reduced quantities of activator while producing polymers with controlled molecular weights.

For the purposes of this present disclosure and the claims thereto, the new numbering scheme for the Periodic Table Groups is used as described in *Chemical and Engineering News*, (1985) v.63(5), pg. 27. Therefore, a "group 8 metal" is an element from group 8 of the Periodic Table, e.g. Fe, Ru, or Os.

"Catalyst productivity" is a measure of how many grams of polymer (P) are produced using a polymerization catalyst including W mmol of catalyst (cat), over a period of time of T hours; and may be expressed by the following formula: P/(T×W) and expressed in units of gP mmolcat$^{-1}$ hr$^{-1}$.

"Conversion" is the amount of monomer that is converted to polymer product, and is reported as mol % and is calculated based on the polymer yield and the amount of monomer fed into the reactor.

An "olefin" is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, includes terpolymers. "Different" as used to refer to mer units indicates that the mer units differ from each other by at least one atom or are different isomerically.

An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof (($R^1R^2$)—C=$CH_2$, where $R^1$ and $R^2$ can be independently hydrogen or a hydrocarbyl group; such as $R^1$ is hydrogen and $R^2$ is an alkyl group). A "linear alpha-olefin" is an alpha-olefin defined in this paragraph where $R^1$ is hydrogen, and $R^2$ is hydrogen or a linear alkyl group.

For the purposes of this present disclosure, ethylene shall be considered an α-olefin.

Unless otherwise specified, the term "C" means hydrocarbon(s) having n carbon atom(s) per molecule, where n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cn-Cm" group or compound refers to a group or compound including carbon atoms at a total number thereof in the range from n to m. Thus, a $C_1$-$C_{50}$ hydrocarbyl group refers to a hydrocarbyl group including carbon atoms at a total number thereof in the range from 1 to 50 and a $C_1$-$C_{50}$ alkyl group refers to an alkyl group including carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms. Suitable hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl, and naphthyl.

The term "heteroatom" refers to a group 13-17 element, excluding carbon. A heteroatom may include B, Si, Ge, Sn, N, P, As, O, S, Se, Te, F, Cl, Br, and I. The term "heteroatom" may include the aforementioned elements with hydrogens attached, such as BH, $BH_2$, $SiH_2$, OH, NH, $NH_2$, etc. The term "substituted heteroatom" describes a heteroatom that has one or more of these hydrogen atoms replaced by a hydrocarbyl or substituted hydrocarbyl group(s).

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, $SiR^*_n(OR^*)_{3-n}$ (n=0, 1, 2 or 3), $GeR^*_n(OR^*)_{3-n}$ (n=0, 1, 2 or 3), —$SnR^*_3$, —$PbR^*_3$, and where each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, $SiR^*_n(OR^*)_{3-n}$ (n=0, 1, 2 or 3), $GeR^*_n(OR^*)_{3-n}$ (n=0, 1, 2 or 3), —$SnR^*_3$, —$PbR^*_3$, or where at least one non-carbon atom or group has been inserted within the hydrocarbyl radical such as —O—, —S—, —Se—, —Te—, —N($R^*$)—, =N—, —P($R^*$)—, =P—, —As($R^*$)—, =As—, —Sb($R^*$)—, =Sb—, —B($R^*$)—, =B—, —$SiR^*(OR^*)_{2-n}$— (n=0, 1, or 2), —$GeR^*_n(OR^*)_{2-n}$— (n=0, 1, or 2), —Sn($R^*)_2$—, —Pb($R^*)_2$— and the like, and where each $R^*$ is independently a hydrocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR^*2$, $OR^*$, $SeR^*$, $TeR^*$, $PR^*_2$, $AsR^*_2$, $SbR^*_2$, $SR^*$, $BR^*_2$, $SiR^*_n(OR^*)_{3-n}$ (n=0, 1, 2 or 3), $GeR^*_n(OR^*)_{3-n}$ (n=0, 1, 2 or 3), $SnR^*_3$, $PbR^*_3$ and the like or where at least one non-carbon atom or group has been inserted within the halocarbyl radical such as —O—, —S—, —Se—, —Te—, —N($R^*$)—, =N—, —P($R^*$)—, =P—, —As($R^*$)—, =As—, —Sb($R^*$)—, =Sb—, —B($R^*$)—, =B—, —$SiR^*$ $(OR^*)_{2-n}$— (n=0, 1, or 2), —$GeR^*$ $(OR^*)_{2-n}$— (n=0, 1, or 2), —Sn$(R^*)_2$—, —Pb$(R^*)_2$— and the like, where $R^*$ is independently a hydrocarbyl or halocarbyl radical provided that at least one halogen atom remains on the original halocarbyl radical. Additionally, two or more $R^*$ may join together to form a substituted or unsubstituted saturated, partially unsaturated or aromatic cyclic or polycyclic ring structure.

The term "substituted aromatic," means an aromatic group having 1 or more hydrogen groups replaced by a hydrocarbyl, substituted hydrocarbyl, heteroatom or heteroatom containing group.

The term "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxide substituents can include methoxy, ethoxy, n-propoxy, iso-propoxy, n-butoxy, iso-butoxy, sec-butoxy, tert-butoxy, phenoxy.

The terms "alkyl radical," and "alkyl" are used interchangeably throughout this disclosure. For purposes of this disclosure, "alkyl radical" is defined to be $C_1$-$C_{100}$ alkyls, which may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_n$(OR*)$_{3-n}$— (n=0, 1, 2 or 3), —GeR*$_n$(OR*)$_{3-n}$— (n=0, 1, 2 or 3), —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. The term "aromatic" also refers to pseudoaromatic heterocycles which are heterocyclic substituents that have similar properties and structures (nearly planar) to aromatic heterocyclic ligands, but are not by definition aromatic.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, phenethyl indenyl is an indene substituted with an ethyl group bound to a benzene group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

Unless otherwise noted all melting points (Tm) are differential scanning calorimetry (DSC) second melt.

The following abbreviations may be used: MAO is methylalumoxane, THF is tetrahydrofuran, and RT is room temperature (and is 23° C. unless otherwise indicated).

A "catalyst system" is a mixture or reaction product of at least one catalyst compound, at least one activator, an optional co-activator, and an optional support material. When "catalyst system" is used to describe such a pair before activation, it means the unactivated catalyst complex (pre-catalyst) together with an activator and, optionally, a co-activator. When it is used to describe such a pair after activation, it means the activated complex and the activator or other charge-balancing moiety. The transition metal compound may be neutral as in a pre-catalyst, or a charged species with a counter ion as in an activated catalyst system. For the purposes of this present disclosure and the claims thereto, when catalyst systems are described as including neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more electrons to a metal ion. A "Lewis base" is a neutrally charged ligand which donates one or more pairs of electrons to a metal ion.

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Suitable systems may be not turbid as described in J. Vladimir Oliveira, C. Dariva and J. C. Pinto (2000) *Ind. Eng. Chem. Res.*, v.29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Catalyst Compounds

This present disclosure relates to a novel group of amidobenzoquinone catalyst compounds and activators, said catalyst having a metal atom attached to Lewis base ligands.

In at least one embodiment this present disclosure related to a catalyst compound, and catalyst systems including such compounds, represented by Formula (I):

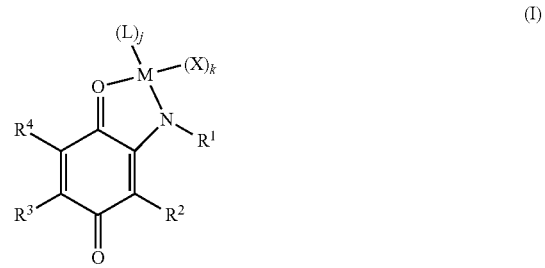

where:
M is a group 8, 9, or 10 transition metal;
L is a Lewis base;
j is 0, 1, or 2;
X is an anionic ligand;
k is 0, 1, or 2; and $R^1$, $R^2$, $R^3$, and $R^4$ are independently selected from hydrogen, substituted or unsubstituted $C_1$-$C_{30}$ hydrocarbyl, —CN, —NR'$_2$, —OR', halogen, —NO$_2$, —SiR'$_3$, five-, six-, or seven-membered heterocyclyl (where each R' is independently hydrogen, $C_1$-$C_{30}$ hydrocarbyl, and R' is optionally substituted by halogen, or two R' radicals optionally bond to form a five- or six-membered ring), or —SiR"$_3$, —SiR"$_2$(OR'), —SiR"(OR')$_2$, or —Si(OR')$_3$ (where each R" and R' is independently hydrogen, $C_1$-$C_{30}$ hydrocarbyl, or two R" radicals optionally bond to form a five- or six-membered ring);

where $R^1$, $R^2$, $R^3$, and $R^4$ are optionally substituted by halogen, —NO$_2$, —CN, —CF$_3$, —CF$_2$CF$_3$, —CH$_2$CF$_3$, —NR'$_2$, —OR', —OSi(OR')$_3$, where each R' is independently hydrogen, $C_1$-$C_{30}$ hydrocarbyl, and R' is optionally substituted by halogen, or two R' radicals optionally bond to form a five- or six-membered ring, or —SiR"$_3$ where each R" is independently hydrogen, $C_1$-$C_{30}$ hydrocarbyl, or two R" radicals optionally bond to form a five- or six-membered ring.

In some embodiments, M of Formula (I) is a metal selected from Ru, Rh, Pd, Fe, Co, or Ni. In some embodiments, M is a metal selected from Fe, Co, or Ni. In at least one embodiment M is Ni. Preferably M is Ni.

Each L, if any, of Formula (I) can be independently selected from ethers, amines, imines, phosphines, nitriles, carbenes, thioethers, esters, THF, and dimethylsulfide. In some embodiments, L is selected from an imine, an amine, a phosphine, a nitrile, an ether, a thioether, a sulfoxide, or a carbene. In at least one embodiment, L is a phosphine, such as triphenylphosphine. L may be absent, present, or present in multiples such that j can be 0, 1, or 2. If j is 2, then two L's may combine to form part of a fused ring or ring system. In some embodiments j is 1. In at least one embodiment j is 1 and L is a phosphine.

Each X, if any, of Formula (I) can be independently selected from the group consisting of hydrocarbyl radicals having from 1 to 20 carbon atoms, hydrides, amides, alkoxides, sulfides, phosphides, halides, dienes, and a combination(s) thereof, such as each X is independently selected from halides and $C_1$ to $C_7$ hydrocarbyl groups, such as X is an alkyl, aryl group, an arylakyl group, or an alkylaryl group, such as each X is a halogen, methyl, ethyl, propyl, benzyl, phenyl, or naphthyl, such as X is phenyl. X may be absent, present, or present in multiples such that k can be 0, 1, or 2. If k is 2, then two X's may form part of a fused ring or ring system. In some embodiments k is 1. In at least one embodiment, k is 1, and X is a phenyl group.

In some embodiments, two L groups of Formula (I) may be joined together to form a bidentate Lewis base; an X group may be joined to an L group to form a monoanionic bidentate group; or any two X groups may be joined together to form a dianionic ligand group.

In some embodiments, $R^3$ and $R^4$ of Formula (I) bond together to form a substituted or unsubstituted aryl group. In at least one embodiment, $R^3$ and $R^4$ bond together to form an aromatic ring incorporating the carbon atoms to which $R^3$ and $R^4$ are attached. In some embodiments, $R^3$ and $R^4$ bond to form a 5 or 6 membered carbocyclic or heterocyclic ring, such as a $C_6$ carbocyclic ring. In at least one embodiment, $R^3$ and $R^4$ bond to form a $C_6$ aromatic ring.

In some embodiments, $R^1$ of Formula (I) is selected from an aryl, an arylalkyl, an alkylaryl, or an alkyl. In some embodiments, $R^1$ is a 2,6-substituted aryl, such as 2,6-dimethylphenyl, 2-chloro-4,6-dimethylphenyl, 2,6-diisopropylphenyl, or 2,6-(diphenylmethyl)-4-methylphenyl. In some embodiments, $R^1$ is a 2,4,6-substituted aryl, such as 2-chloro-4,6-dimethylphenyl, or 2,6-(diphenylmethyl)-4-methylphenyl. In at least one embodiment, $R^1$ is 2,6-(diphenylmethyl)-4-methylphenyl.

In some embodiments, $R^2$ of Formula (I) is selected from hydrogen, halogen, or alkyl, for example, $R^2$ may be a hydrogen, methyl, ethyl, propyl, fluoro, chloro, bromo, or iodo. In some embodiments, $R^2$ is selected from hydrogen, methyl, fluoro, or chloro. In at least one embodiment, $R^2$ is hydrogen.

In some embodiments, the catalyst compound represented by Formula (I) is represented by Formula (Ia):

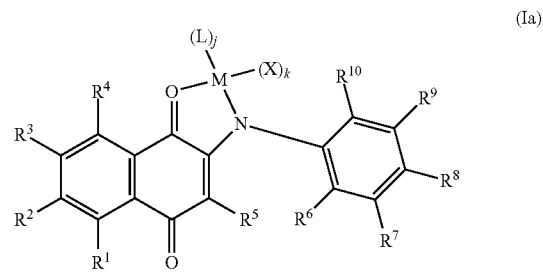

wherein:
M is a group 8, 9, or 10 transition metal;
L is a Lewis base;
j is 0, 1, or 2;
X is an anionic ligand;
k is 0, 1, or 2; and
each of $R^1$, $R^2$, $R^3$, $R^4$, $R^5$, $R^6$, $R^7$, R, $R^9$, and $R^1$ is independently selected from hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —NR'$_2$, —OR', halogen, —NO$_2$, —SiR'$_3$, five-, six-, or seven-membered heterocyclyl (where each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, and R' is optionally substituted by halogen, or two R' radicals optionally bond to form a five- or six-membered ring), or —SiR"$_3$ (where each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring);

where $R^1$, $R^2$, $R^3$, $R^4$, $R^5$, $R^6$, $R^7$, $R^8$, $R^9$, and $R^{10}$ are optionally substituted by halogen, —NO$_2$, —CF$_3$, —CF$_2$CF$_3$, —CH$_2$CF$_3$, —NR'$_2$, —OR' (where each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, and R' is optionally substituted by halogen, or two R' radicals optionally bond to form a five- or six-membered ring), or —SiR"$_3$ (where each R" is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two R" radicals optionally bond to form a five- or six-membered ring).

In some embodiments, M of Formula (Ia) is a metal selected from Ru, Rh, Pd, Fe, Co, or Ni. In some embodiments, M is a metal selected from Fe, Co, or Ni. In at least one embodiment M is Ni. Preferably M is Ni.

Each L, if any, of Formula (Ia) can be independently selected from ethers, amines, imines, phosphines, nitriles, carbenes, thioethers, esters, THF, and dimethylsulfide. In some embodiments, L is selected from an imine, an amine, a phosphine, a nitrile, an ether, a thioether, a sulfoxide, or a carbene. In at least one embodiment, L is a phosphine, such as triphenylphosphine. L may be absent, present, or present in multiples such that j can be 0, 1, or 2. If j is 2, then two L's may combine to form part of a fused ring or ring system. In some embodiments j is 1. In at least one embodiment j is 1 and L is a phosphine.

Each X, if any, of Formula (Ia) can be independently selected from the group consisting of hydrocarbyl radicals having from 1 to 20 carbon atoms, hydrides, amides, alkoxides, sulfides, phosphides, halides, dienes, and a combination(s) thereof, such as each X is independently selected from halides and $C_1$ to $C_7$ hydrocarbyl groups, such as X is an alkyl, aryl group, an arylakyl group, or an alkylaryl group, such as each X is methyl, ethyl, propyl, benzyl, phenyl, or naphthyl, such as X is phenyl. X may be absent, present, or present in multiples such that k can be 0, 1, or 2. If k is 2, then two X's may form part of a fused ring or ring system. In some embodiments k is 1. In at least one embodiment, k is 1, and X is a phenyl group.

In some embodiments, two L groups of Formula (Ia) may be joined together to form a bidentate Lewis base; an X group may be joined to an L group to form a monoanionic bidentate group; or any two X groups may be joined together to form a dianionic ligand group.

In some embodiments, $R^5$ of Formula (Ia) is selected from hydrogen, halogen, or alkyl, for example, $R^5$ may be a hydrogen, methyl, ethyl, propyl, fluoro, chloro, bromo, or iodo. In some embodiments, $R^5$ is selected from hydrogen, methyl, fluoro, or chloro. In at least one embodiment, $R^5$ is hydrogen.

In some embodiments, each of $R^1$, $R^2$, $R^3$, and $R^4$ of Formula (Ia) is independently selected from hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, and alkylaryl where alkyl has from 1 to 10 carbon atoms and aryl has from 6 to 20 carbon atoms. In some embodiments, each of $R^1$, $R^2$, $R^3$, and $R^4$ is independently selected from hydrogen, methyl, ethyl, propyl, butyl, pentyl, or hexyl. In at least one embodiment, each of $R^1$, $R^2$, $R^3$, and $R^4$ is hydrogen.

In some embodiments, each of $R^6$, $R^7$, $R^8$, $R^9$, and $R^{10}$ of Formula (Ia) is independently selected from hydrogen, halogen, $C$—$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, and alkylaryl where alkyl has from 1 to 10 carbon atoms and aryl has from 6 to 20 carbon atoms. In some embodiments, each of $R^6$, $R^7$, $R^8$, $R^9$, and $R^{10}$ is independently selected from hydrogen, methyl, ethyl, propyl, butyl, pentyl, hexyl, chloro, fluoro, bromo, or iodo. In some embodiments, $R^6$ and $R^{10}$ are independently selected from hydrogen, methyl, ethyl, propyl, phenyl, benzyl, chloro, and fluoro and each of $R^7$, $R^8$, and $R^9$ is independently selected from hydrogen, methyl, ethyl, propyl, and phenyl. In some embodiments, $R^6$ and $R^{10}$ are independently selected from hydrogen, methyl, ethyl, propyl, phenyl, benzyl, chloro, and fluoro, and each of $R^7$, $R^8$, and $R^9$ is independently selected from hydrogen, methyl, or phenyl.

In at least one embodiment, a catalyst compound represented by Formula (I) or Formula (Ia) is selected from:

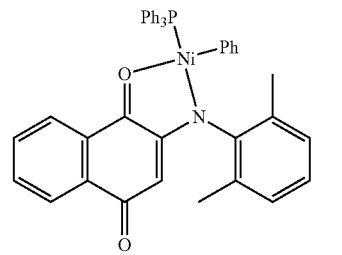

1

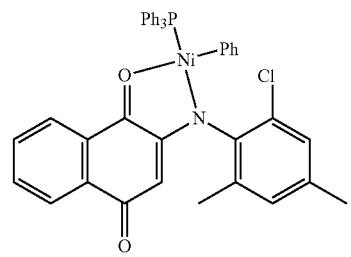

2

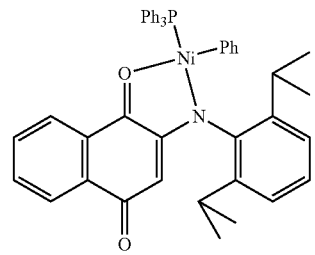

3

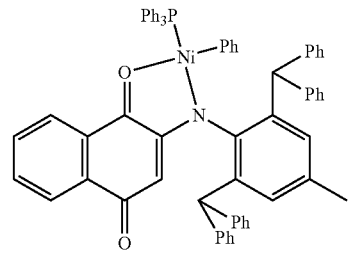

4

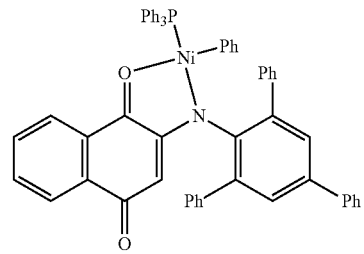

5

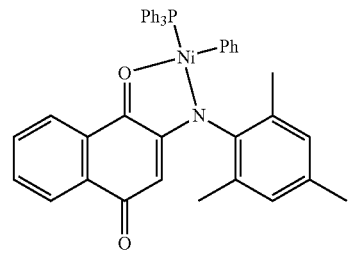

6

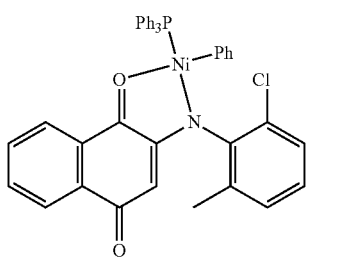
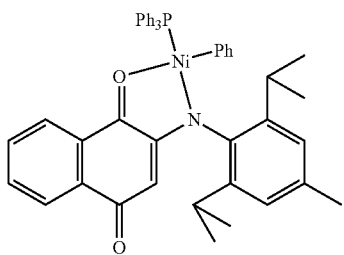
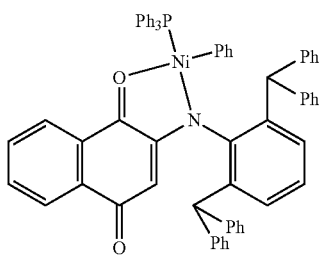
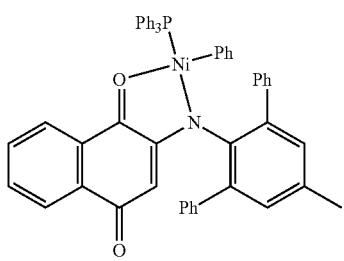
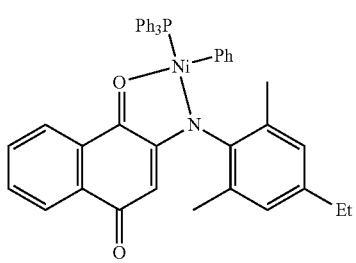
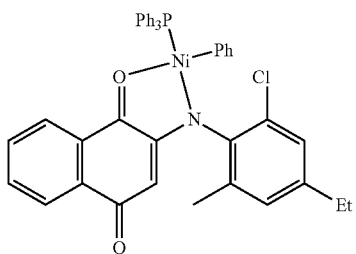
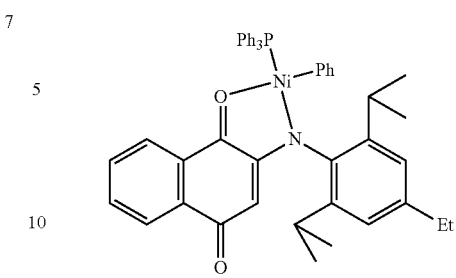
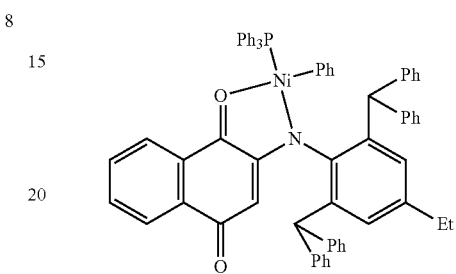
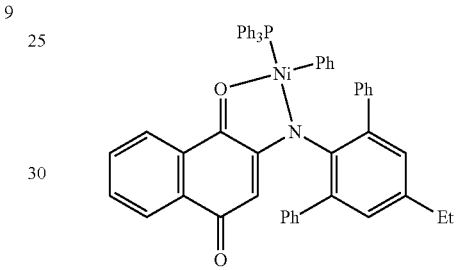
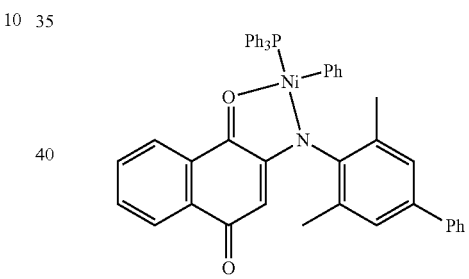
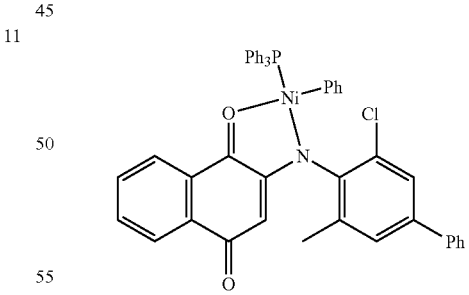
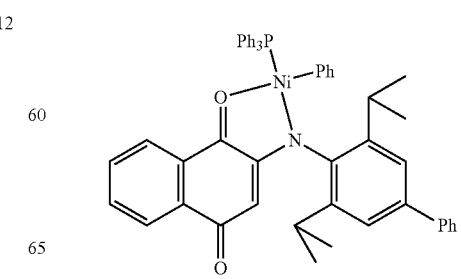

19
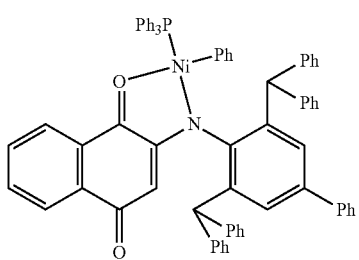
20
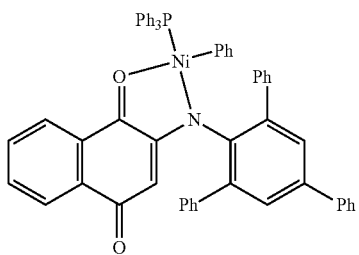
21
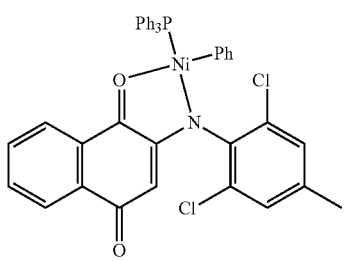
22
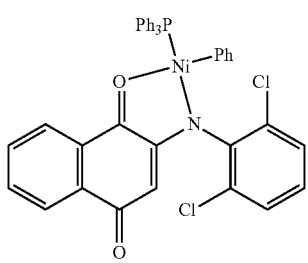
23
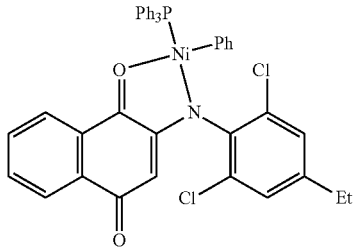
24
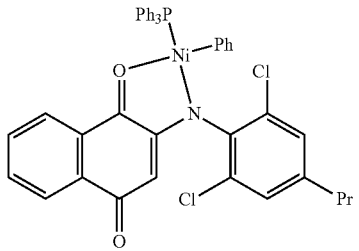
25
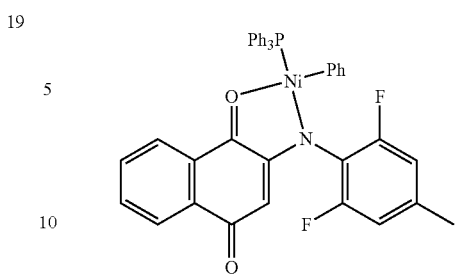
26
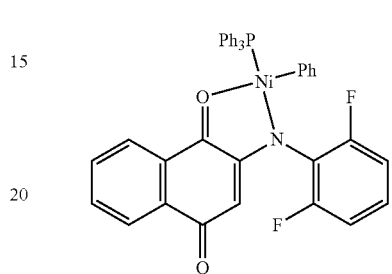
27
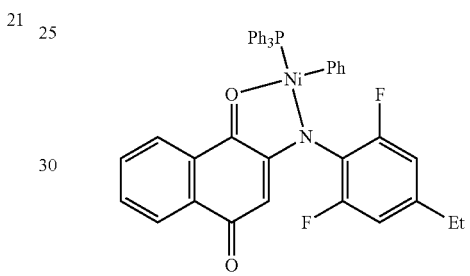
28
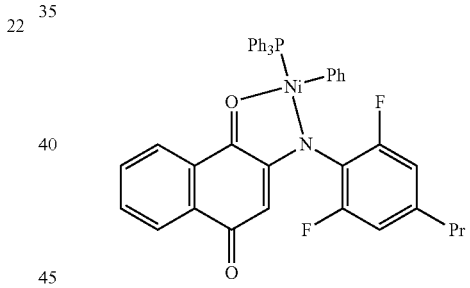
29
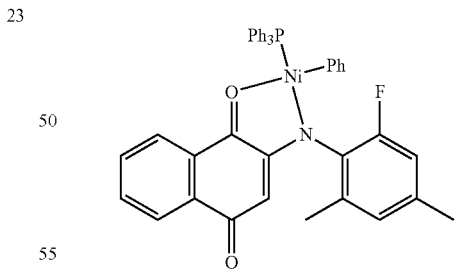
30
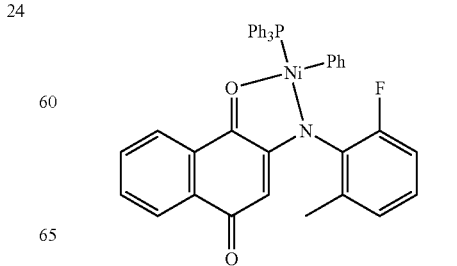

31
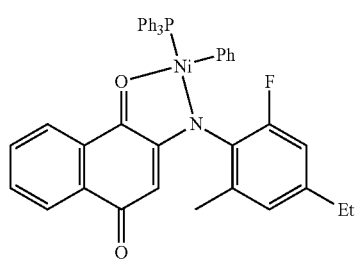
32
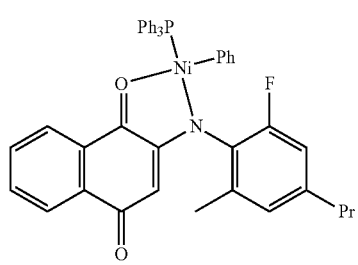
33
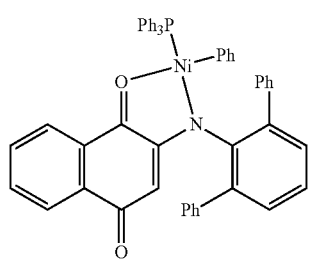
In at least one embodiment, a catalyst compound represented by Formula (I) or Formula (Ia) is selected from:
1
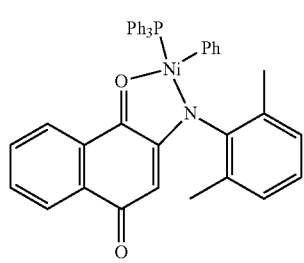
2
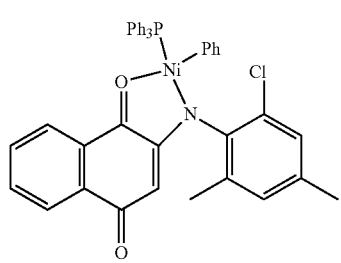
3
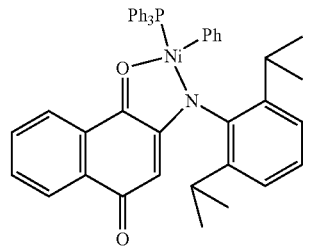
4
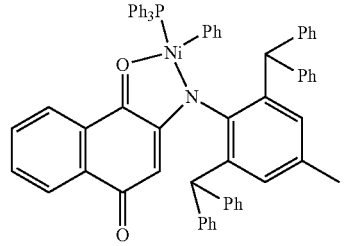
5
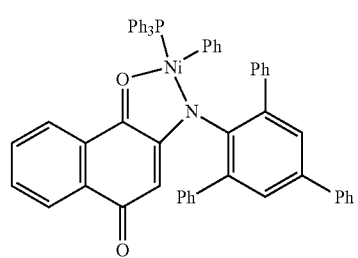
In at least one embodiment, a catalyst compound represented by Formula (I) or Formula (Ia) is selected from:
1
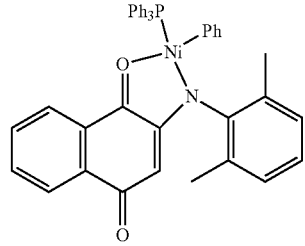
2
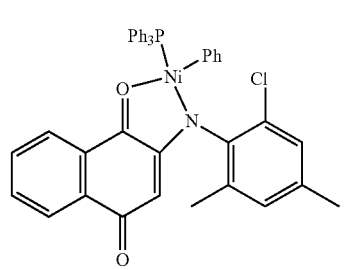

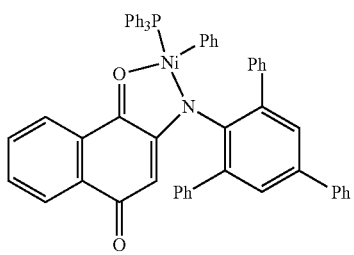

In at least one embodiment of the processes described herein one catalyst compound is used, e.g. the catalyst compounds are not different. For purposes of this present disclosure one catalyst compound is considered different from another if they differ by at least one atom.

In at least one embodiment, two or more different catalyst compounds are present in the catalyst system described herein. In at least one embodiment, two or more different catalyst compounds are present in the reaction zone where the process(es) described herein occur. When two transition metal compound based catalysts are used in one reactor as a mixed catalyst system, the two transition metal compounds can be chosen such that the two are compatible. A simple screening method such as by $^1$H or $^{13}$C NMR, known to those of ordinary skill in the art, can be used to determine which transition metal compounds are compatible. For example, the same activator can be used for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the transition metal compound(s) may be contacted with an alkylating compound (such as alumoxane) prior to addition of the non-coordinating anion activator.

The two transition metal compounds (pre-catalysts) may be used in any suitable ratio. Suitable molar ratios of (A) transition metal compound to (B) transition metal compound (A:B) may be 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percent of A and B, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds

A potassium salt of an amido-benzoquinone is suspended in solvent. To the suspension is added a solution of transition metal M with at least one of L and X attached. The mixture is warmed, stirred, and solvent removed. The residue can be washed with hydrocarbon solvent and recrystallized.

To a THF suspension of ligand can be added a THF solution of (PPh$_3$)$_2$NiPhCl at reduced temperature. The reaction can be allowed to slowly warm up to RT and stirred for, for example, 12 hours at RT. The solvent can be removed under reduced pressures. The residue can be washed with 15 mL of hexane. To the washed solid can be added benzene, and the insoluble salts can be removed via filtration, for example, through a plug of Celite™ filter material. Solvents can be again removed under reduced pressure, affording a product. Recrystallization using, for example, THF and pentane can afford substantially pure catalyst compound.

Activators

The terms "cocatalyst" and "activator" are used interchangeably. The activator is represented by the Formula (II):

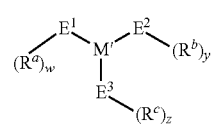

(II)

where:

M' is selected from boron, aluminum, or gallium;

$E^1$, $E^2$, and $E^3$ are independently selected from oxygen, nitrogen, phosphorus, sulfur or halogen;

$R^a$, $R^b$, and $R^c$ are independently selected from a $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 30 carbon atoms, alkylaryl where alkyl has from 1 to 10 carbon atoms and aryl has from 6 to 30 carbon atoms, a support material, or two or more of $R^a$, $R^b$, and $R^c$ are optionally bonded to form a five-, six- or seven-membered carbocyclic or heterocyclic ring, the heterocyclic ring comprising at least one atom from the group consisting of N, P, O and S;

where $R^a$, $R^b$, and $R^c$ are optionally substituted by halogen, —NO$_2$, —CF$_3$, —CF$_2$CF$_3$, —CH$_2$CF$_3$, —NR'$_2$, —OR' (where each R' is independently hydrogen, $C_1$-$C_{22}$-hydrocarbyl, and R' is optionally substituted by halogen, or two R' radicals optionally bond to form a five- or six-membered ring), or —SiR"$_3$ (where each R" is independently hydrogen, $C_1$-$C_{22}$-hydrocarbyl, or two R" radicals optionally bond to form a five- or six-membered ring);

w is 0 if $E^1$ is a halogen, y is 0 if $E^2$ is a halogen, and z is 0 if $E^3$ is a halogen;

w is 1 if $E^1$ is oxygen or sulfur and w is 2 if E is nitrogen or phosphorus;

y is 1 if $E^2$ is oxygen or sulfur and y is 2 if $E^2$ is nitrogen or phosphorus; and z is 1 if $E^3$ is oxygen or sulfur and z is 2 if $E^3$ is nitrogen or phosphorus.

In some embodiments, M' is aluminum. Preferably M is Al.

In some embodiments, w, y, and z are 1. In some embodiments, $E^1$, $E^2$, and $E^3$ are oxygen. In other embodiments w, y, and z are 2. In some embodiments, $E^1$, $E^2$, and $E^3$ are nitrogen. In at least one embodiment, w, y, and z are 1 and $E^1$, $E^2$, and $E^3$ are oxygen.

In some embodiments, $R^a$, $R^b$, and $R^c$ are independently selected from aryl, arylalkyl, or alkyl. In some embodiments, $R^a$, $R^b$, and $R^c$ have the same chemical structure. In some embodiments, $R^a$, $R^b$, and $R^c$ have the same chemical structure selected from aryl, arylalkyl, or alkyl, such as phenyl, 2,3,4,5,6-pentamethylphenyl, perfluorophenyl, perchlorophenyl, —CF$_3$, —CF$_2$CF$_3$, or —CH$_2$CF$_3$. In at least one embodiment, $R^a$, $R^b$, and $R^c$ are perfluorophenyl.

In other embodiments, at least one of $R^a$, $R^b$, and $R^c$ is selected from a support. Suitable supports may be an inorganic oxide, such as Groups 2, 4, 13, and 14 metal oxides, such as silica, alumina, magnesia, titania, zirconia and mixtures thereof. Other suitable support materials may include, for example, functionalized polyolefins, such as finely divided polyethylene or polystyrene. Particularly useful supports include silica, alumina, magnesia, titania, zirconia, montmorillonite, phyllosilicate, zeolites, talc, clays, and mixture(s) thereof. In some embodiments, at least one of $R^a$, $R^b$, and $R^c$ is selected from silica, alumina, or a mixture thereof. In such embodiments, the remaining R groups may be independently selected from aryl, arylalkyl, or alkyl, for example, if $R^a$ is silica then $R^b$ and/or $R^c$ may be selected from phenyl, 2,3,4,5,6-pentamethylphenyl, perfluorophenyl, perchlorophenyl, —$CF_3$, —$CF_2CF_3$, or —$CH_2CF_3$.

The catalyst systems described herein typically include a catalyst compound as described above and an activator as described above and may be formed by combining the catalyst compound described herein with activators in any suitable manner including combining them with physical supports, such as silica. The catalyst systems may also be added to or generated in solution polymerization or bulk polymerization (in the monomer). Catalyst systems of the present disclosure may have additional activators and one, two or more catalyst compounds. Activators are defined to be a compound which can activate one of the catalyst compounds described above by converting the neutral metal compound to a catalytically active metal compound cation.

Example activators may include:

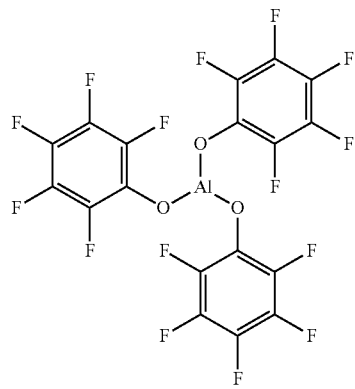
A1

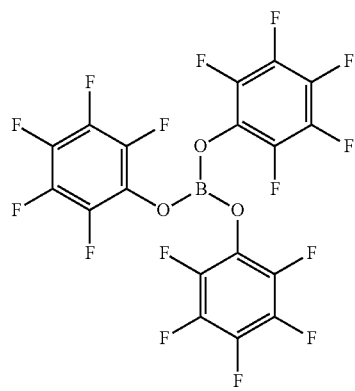
A2

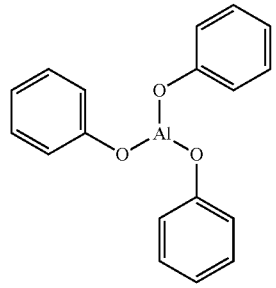
A3

-continued

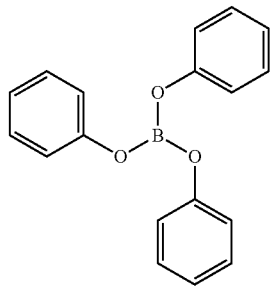
A4

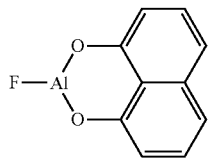
A7

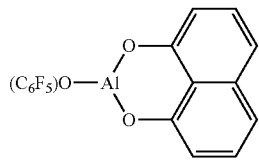
A8

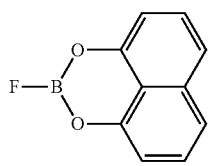
A9

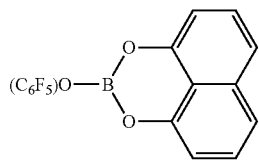
A10

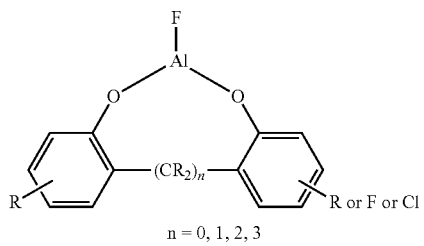
n = 0, 1, 2, 3
A11

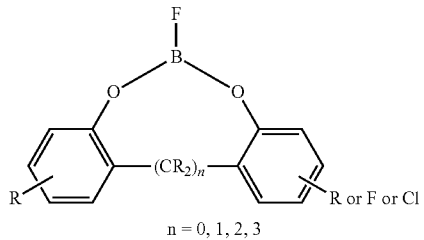
n = 0, 1, 2, 3
A12

A13

A14

A15

A16

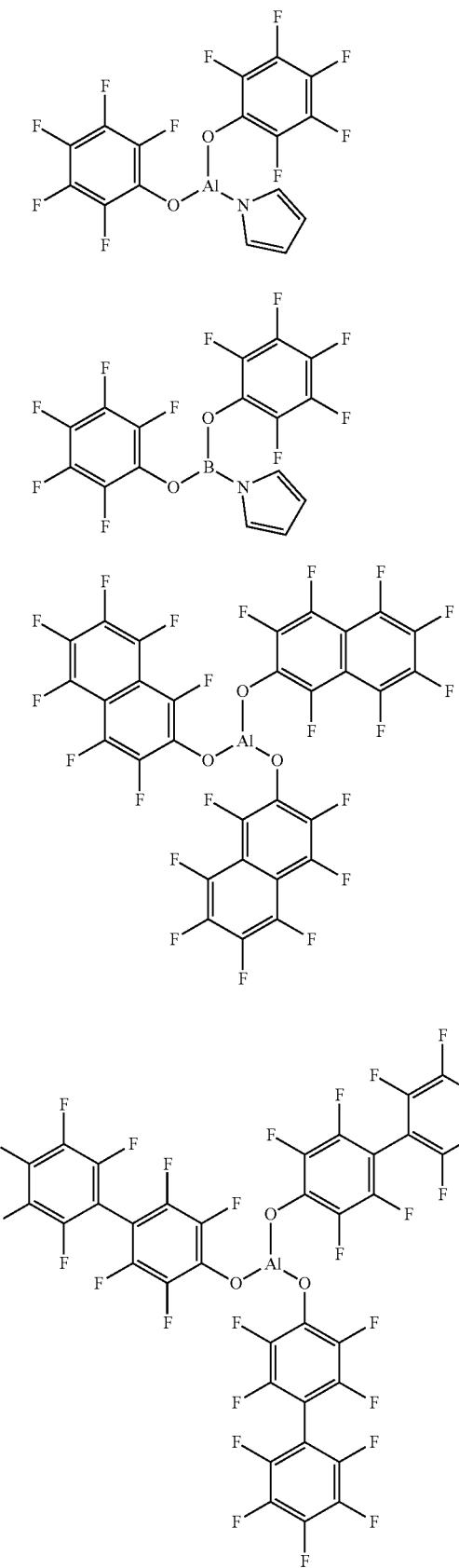

Exemplary Method to Prepare the Activators of Formula (II)

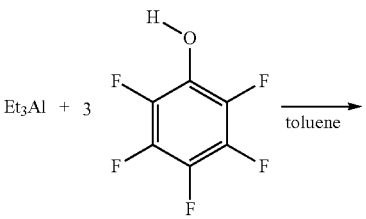

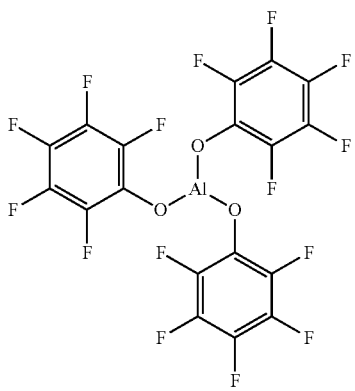

To a toluene solution (30 mL) of Et$_3$Al (1.355 g, 11.87 mmol) can be added at −30° C. toluene solution (20 mL) of perfluorophenol (6.335 g, 34.42 mmol) dropwise at −30° C. The reaction was heated at 60° C. for 3 hours. 100 mL of pentane can be added, leading to the formation of a white precipitate which was isolated by filtration and washed with pentane. Yield: 5.81 g. $^{19}$F{$^1$H} NMR (THF-d$_8$): δ−164.0 (d, 2F, 22.1 Hz), −175.7 (dd, 2F, 22.1 Hz, 22.4 Hz), −168.3 (t, 1F, 22.4 Hz).

Optional Additional Activators—Alumoxanes

Alumoxane activators may be utilized as additional activators in the catalyst systems described herein. Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the additional activator is an alumoxane (modified or unmodified), at least one embodiment select the maximum amount of additional activator typically at up to a 5,000-fold molar excess Al/M over the catalyst compound (per metal catalytic site). The minimum activator-to-catalyst-compound is a 1:1 molar ratio. Alternate suitable ranges include from 1:1 to 500:1, alternately from 1:1 to 200:1, alternately from 1:1 to 100:1, or alternately from 1:1 to 50:1.

In at least one embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Optional Additional Activators—Ionizing/Non Coordinating Anions

The term "non-coordinating anion" (NCA) is defined to mean an anion either that does not coordinate to the catalyst metal cation or that does coordinate to the metal cation, but only weakly, preferably remaining sufficiently labile to be displaced by a neutral Lewis base. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl) boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization. Additional activators useful herein may include an NCA, particularly a compatible NCA.

It is within the scope of this present disclosure to use an NCA alone or in combination with alumoxane or modified alumoxane as additional activators. For descriptions of useful additional activators please see U.S. Pat. Nos. 8,658, 556 and 6,211,105.

Suitable non-coordinating activators include N,N-dimethylanilinium tetrakis(perfluoronaphthyl)borate, N,N-dimethylaniliniumtetrakis(perfluorobiphenyl)borate, N,N-dimethylaniliniumtetrakis(perfluorophenyl)borate, N,N-dimethylaniliniumtetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Me$_3$NH$^+$][B(C$_6$F$_5$)$_4$—]; 1-(4-(tris (pentafluorophenyl)borate)-2,3,5,6-tetrafluorophenyl) pyrrolidinium; and tetrakis(pentafluorophenyl)borate, 4-(tris (pentafluorophenyl)borate)-2,3,5,6-tetrafluoropyridine.

In at least one embodiment, an additional activator includes a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, an additional activator includes one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl) borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl) phenyl)borate, N,N-dialkyl-(2,4,6-trimethylanilinium) tetrakis(3,5-bis(trifluoromethyl)phenyl)borate, di-(i-propyl) ammonium tetrakis(pentafluorophenyl)borate, (where alkyl is methyl, ethyl, propyl, n-butyl, sec-butyl, or t-butyl).

In an embodiment, an additional activator is represented by Formula (III):

$$(Z)_d^+(A^{d-}) \qquad (III)$$

where Z is (L-H) or a reducible Lewis Acid, L is an neutral Lewis base; H is hydrogen; (L-H)$^+$ is a Brønsted acid; A$^{d-}$ is a non-coordinating anion having the charge d−; and d is an integer from 1 to 3, such as Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl.

When Z$_d^+$ is the activating cation (L-H)$_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

In an embodiment the, NCA activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3, preferably Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl. The anion component A$^{d-}$ includes those having the formula [M$^{k+}$Q$_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms (optionally with the proviso that in not more than 1 occurrence is Q a halide). Preferably, each Q is a fluorinated hydrocarbyl group having 1 to 20 carbon atoms, more preferably each Q is a fluorinated aryl group, and most preferably each Q is a pentafluoryl aryl group or perfluoronaphthyl group. Examples of suitable $A^{d-}$ also include diboron compounds as disclosed in U.S. Pat. No. 5,447,895, which is fully incorporated herein by reference.

Suitable activator-to-catalyst ratio, e.g., all activators-to-catalyst ratio can be about a 1:1 molar ratio. Alternately, suitable ranges may include from 0.1:1 to 100:1, alternately from 0.5:1 to 200:1, alternately from 1:1 to 500:1 alternately from 1:1 to 1000:1. For example, suitable ranges can be from 0.5:1 to 10:1, such as 1:1 to 5:1.

It is also within the scope of the present disclosure that the catalyst compounds can be combined with combinations of the activator and additional activators including alumoxanes and NCA's (see for example, U.S. Pat. Nos. 5,153,157; 5,453,410; EP 0 573 120 B1; WO 1994/007928; and WO 1995/014044 (the disclosures of which are incorporated by reference) which discuss the use of an alumoxane in combination with an ionizing activator).

Optional Scavengers, Co-Activators, Chain Transfer Agents

In addition to activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain transfer agents may be used in the catalyst systems and or processes described herein. Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Physical Support Materials

In some embodiments, the catalyst system may include an inert physical support material. The physical support material can be a porous support material, for example, talc, and inorganic oxides. Other physical support materials include zeolites, clays, organoclays, or any other suitable organic or inorganic support material, or mixtures thereof.

For example, the physical support material can be an inorganic oxide in a finely divided form. Suitable inorganic oxide materials for use in catalyst systems may include Groups 2, 4, 13, and 14 metal oxides, such as silica, alumina, and mixtures thereof. Other inorganic oxides that may be employed either alone or in combination with the silica, or alumina are magnesia, titania, or zirconia. Other suitable physical support materials, however, can be employed, for example, finely divided functionalized polyolefins, such as finely divided polyethylene or polystyrene. Particularly useful supports include magnesia, titania, zirconia, montmorillonite, phyllosilicate, zeolites, talc, and clays. Also, combinations of these support materials may be used, for example, silica-chromium, silica-alumina, or silica-titania. Suitable support materials include $Al_2O_3$, $ZrO_2$, $SiO_2$, and combinations thereof, such as $SiO_2$, $Al_2O_3$, or $SiO_2/Al_2O_3$.

The physical support material, such as an inorganic oxide, can have a surface area of from about 10 to about 700 m$^2$/g, pore volume of from about 0.1 to about 4 cc/g and average particle size of from about 5 to about 500 μm. Furthermore, the surface area of the physical support material can be, for example, from about 50 m$^2$/g to about 500 m$^2$/g, the pore volume can be from about 0.5 cc/g to about 3.5 cc/g and the average particle size can be from about 10 μm to about 200 μm. The surface area of the physical support material can further be from about 100 m$^2$/g to about 400 m$^2$/g, pore volume from about 0.8 cc/g to about 3 cc/g and average particle size from about 5 μm to about 100 μm. For purposes of the present disclosure, the average pore size of the physical support material can be from 10 Å to 1000 Å, such as 50 Å to about 500 Å, such as 75 Å to about 350 Å. In at least one embodiment, the physical support material is a high surface area, amorphous silica (surface area=300 m$^2$/gm; pore volume of 1.65 cm$^3$/gm). Suitable silicas are marketed under the tradenames of DAVISON™ 952 or DAVISON™ 955 by the Davison Chemical Division of W.R. Grace and Company. In other embodiments DAVISON™ 948 is used. Alternatively, a silica can be ES-70™ silica (PQ Corporation, Malvern, Pa.) that has been calcined (such as at 875° C.), for example.

The physical support material should be dry, that is, free of absorbed water. Drying of the physical support material can be effected by heating or calcining at about 100° C. to about 1,000° C., such as at least about 600° C. When the physical support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material must have at least some reactive hydroxyl (OH) groups to produce physically supported catalyst systems of this present disclosure. The calcined support material is then contacted with at least one polymerization catalyst including at least one catalyst compound and an activator.

The physical support material, having reactive surface groups, typically hydroxyl groups, is slurried in a non-polar solvent and the resulting slurry is contacted with a solution of a catalyst compound and an activator. In at least one embodiment, the slurry of the physical support material is first contacted with the activator for a period of time from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the physical support material is first contacted with the catalyst compound for a period of time from about 0.5 hours to about 24 hours, from about 2 hours to about 16 hours, or from about 4 hours to about 8 hours. The slurry of the supported catalyst compound is then contacted with the activator solution.

The mixture of the catalyst, activator(s) and support is heated to about 0° C. to about 70° C., such as about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants, i.e., the activator, and the catalyst compound, are at least partially soluble and which are liquid at reaction temperatures. Suitable non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In some embodiments, the present disclosure relates to polymerization processes where monomer (such as ethylene), and optionally comonomer, are contacted with a catalyst system including an activator, at least one catalyst compound, and optionally additional activators, as described above. The catalyst compound and activator may be combined in any suitable order, and are combined typically prior to contacting with the monomer.

Monomers suitable for use may include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment of the present disclosure, the monomer includes propylene and an optional comonomers including one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another embodiment, the monomer includes ethylene and an optional comonomers including one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_4$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced at up to 10 weight %, such as at 0.00001 to 1 weight %, such as 0.002 to 0.5 weight %, such as 0.003 to 0.2 weight %, based upon the total weight of the composition. In at least one embodiment 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Suitable diolefin monomers useful in this present disclosure include hydrocarbon structure(s), such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e. di-vinyl monomers). The diolefin monomers can be linear di-vinyl monomers, such as those containing from 4 to 30 carbon atoms. Examples of suitable dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, such as dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Suitable cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this present disclosure can be carried out in any suitable manner known in the art including: suspension, homogeneous, bulk, solution, slurry, or gas phase polymerization processes. Such processes can be run in a batch, semi-batch, or continuous mode. Homogeneous polymerization processes and slurry processes can be employed. (A homogeneous polymerization process is preferably a process where at least 90 wt % of the product is soluble in the reaction media.) A homogeneous polymerization process can be a bulk homogeneous process. (A bulk process is preferably a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. The term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Suitable polymerizations can be run at temperatures and/or pressures suitable to obtain the desired ethylene polymers. Suitable temperatures and/or pressures may include a temperature of from about 0° C. to about 300° C., such as about 20° C. to about 200° C., such as about 35° C. to about 150° C., such as from about 40° C. to about 120° C., such as from about 70° C. to about 100° C.; and at a pressure of from about 0.35 MPa to about 10 MPa, such as from about 0.45 MPa to about 6 MPa, such as from about 0.5 MPa to about 4 MPa.

In a suitable polymerization, the run time of the reaction can be up to 300 minutes, such as from about 5 to 250 minutes, such as from about 10 to 120 minutes. In a continuous process the run time may be the average residence time of the reactor.

In at least one embodiment hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In an alternate embodiment, the activity of the catalyst is at least 10,000 kg/mol/hour, such as 50,000 or more kg/mol/hour, such as 100,000 or more kg/mol/hr, such as 150,000 or more kg/mol/hr. In an alternate embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no scavenger is used in the process to produce the ethylene polymer. For example, scavenger (such as tri alkyl aluminum) can be present at zero mol %, alternately the scavenger can be present at a molar ratio of scavenger metal to transition metal of less than 100:1, such as less than 50:1, such as less than 15:1, such as less than 10:1.

In at least one embodiment, the polymerization: 1) is conducted at temperatures of 0° C. to 300° C. (such as 25° C. to 150° C., such as 40° C. to 120° C., such as 45° C. to 80° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics can be present in the solvent at less than 1 wt %, such as less than 0.5 wt %, such as at 0 wt % based upon the weight of the solvents); 4) where the catalyst system used in the polymerization includes activator at a molar ratio of M' of the activator to M of the catalyst of 0.5:1 to 500:1, from 0.75:1 to 300:1, alternately from 1;1 to 100:1, alternately from 1:1 to 50:1; 5) the polymerization occurs in one reaction zone; 6) the productivity of the catalyst compound is at least 80,000 g/mmol/hr (such as at least 150,000 g/mmol/hr, such as at least 200,000 g/mmol/hr, such as at least 250,000 g/mmol/hr, such as at least 300,000 g/mmol/hr, such as from 5,000 g/mmol/hr to 100,000 g/mmol/hr); 7) optionally scavengers (such as trialkyl aluminum compounds) are absent (e.g. present at zero mol %, alternately the scavenger is present at a molar ratio of scavenger metal to transition metal of less than 100:1, such as less than 50:1, such as less than 15:1, such as less than 10:1); 8) optionally hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)); and 9) where the catalyst system used in the polymerization includes co-activator at less than 0.5 mol %, preferably 0%. In at least one embodiment, the catalyst system used in the polymerization includes no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This present disclosure also relates to compositions of matter produced by methods described.

Processes of this present disclosure may produce olefin polymers, such as polyethylene and polypropylene homopolymers and copolymers. In at least one embodiment, the polymers produced are homopolymers of ethylene or propylene, are copolymers of ethylene having, for example, from 0 to 25 mol % (alternately from 0.5 to 20 mol %, alternately from 1 to 15 mol %, such as from 3 to 10 mol %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene having from 0 to 25 mol % (alternately from 0.5 to 20 mol %, alternately from 1 to 15 mol %, such as from 3 to 10 mol %) of one or more of $C_2$ or $C_4$ to $C_{20}$ olefin comonomer (such as ethylene or $C_4$ to $C_{12}$ alpha-olefin, such as ethylene, butene, hexene, octene, decene, dodecene, such as ethylene, butene, hexene, octene).

In at least one embodiment, the monomer is ethylene and the comonomer is hexene, such as from 1 to 15 mol % hexene, alternately 1 to 10 mol %.

Typically, the polymers produced have an Mw of 5,000 to 5,000,000 g/mol (such as 5,000 to 3,000,000 g/mol, such as 10,000 to 2,000,000 g/mol, such as 25,000 to 750,000 g/mol, such as 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

Typically, the polymers produced have a high weight average molecular weight (Mw) of 100,000 g/mol or more, such as 500,000 g/mol or more, such as 1,000,000 g/mol or more, such as 1,500,000 g/mol or more, such as 2,000,000 g/mol or more, such as 2,500,000 g/mol or more, such as 3,000,000 g/mol or more.

Typically, the polymers produced have a high number average molecular weight (Mn) of 100,000 g/mol or more, such as 500,000 g/mol or more, such as 1,000,000 g/mol or more, such as 1,500,000 g/mol or more, such as 2,000,000 g/mol or more.

Typically, the polymers produced have an Mw/Mn of greater than 1 to 10 (alternately 1.2 to 8, alternately 1.3 to 7, alternately 1.4 to 6, 1.5 to 4, alternately 1.5 to 3).

In at least one embodiment, a polymer of the present disclosure has an Mn from about 100,000 g/mol to about 3,000,000, such as from about 175,000 g/mol to about 2,000,000 g/mol, such as from about 250,000 g/mol to about 1,250,000 g/mol, such as from about 350,000 g/mol to about 1,000,000 g/mol.

In at least one embodiment, the ethylene or propylene based polymer has a melting point (Tm) of at least 100° C., such as from about 100° C. to about 150° C., such as from about 100° C. to about 140° C.

In at least one embodiment, the polymer produced has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

GPC 4-D:

For purposes of the claims, and unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) including ~300 ppm antioxidant BHT is used as the mobile phase at a nominal flow rate of ~1 m/min and a nominal injection volume of ~200 μL. The whole system including transfer lines, columns, and detectors is contained in an oven maintained at ~145° C. A given amount of sample is weighed and sealed in a standard vial with ~10 μL flow marker (heptane) added thereto. After loading the vial in the auto-sampler, the oligomer or polymer is automatically dissolved in the instrument with ~8 mL added TCB solvent at ~160° C. with continuous shaking. The sample solution concentration is from ~0.2 to ~2 mg/ml, with lower concentrations used for higher molecular weight samples.

The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1} \log M_{PS}$$

where the variables with subscript "PS" stand for polystyrene while those without a subscript are for the test samples. In this method, $\alpha_{PS}$=0.67 and $K_{PS}$=0.000175, α and K for other materials are as calculated and published in literature (Sun, T. et al. (2001) Macromolecules, v.34, pg. 6812), except that for purposes of this present disclosure and claims thereto, α=0.700 and K=0.0003931 for ethylene, propylene, diene monomer copolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1-0.0087*w2b+0.000018*(w2b)^) for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, and a is 0.695 and K is 0.000579*(1-0.0077*w2b) for ethylene-octene copolymer where w2b is a bulk weight percent of octene comonomer. Concentrations are expressed in $g/cm^3$, molecular weight is expressed in g/mol, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3 end/1000TC) is obtained by weight-averaging the chain-end correction over the molecular-weight range according to the following equations:

$$w2b = f * \text{bulk CH3/1000TC}$$

$$\text{bulk SCB/1000TC} = \text{bulk CH3/1000TC} - \text{bulk CH3 end/1000TC}$$

where bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (Light Scattering from Polymer Solutions; Huglin, M. B., Ed.; Academic Press, 1972):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the IR5 analysis, $A_2$ is the second virial coefficient, P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and a are for the reference linear polymer, which are, for purposes of this present disclosure and claims thereto, except that for purposes of this present disclosure and claims thereto, α=0.700 and K=0.0003931 for ethylene, propylene, diene monomer copolymers, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

In at least one embodiment the polymer produced has a composition distribution breadth index (CDBI) of 50% or more, such as 60% or more, such as 70% or more. CDBI is a measure of the composition distribution of monomer within the polymer chains and is measured by the procedure described in PCT publication WO 1993/003093, published Feb. 18, 1993, specifically columns 7 and 8 as well as in Wild et al. (1982) J. Poly. Sci., Poly. Phys. Ed., v.20, p. 441, and U.S. Pat. No. 5,008,204, including that fractions having a weight average molecular weight (Mw) below 15,000 g/mol are ignored when determining CDBI.

Blends

In another embodiment, the polymer (such as the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 to 99 wt %, based upon the weight of the polymers in the blend, such as 20 to 95 wt %, v at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

One or more of the foregoing polymers, such as the foregoing polyethylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

This invention also relates to:
1. A catalyst system comprising a catalyst compound and an activator, wherein the catalyst compound is represented by Formula (I):

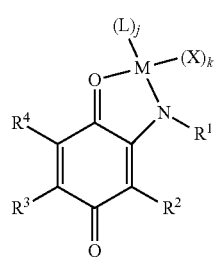

wherein:
M is a group 8, 9, or 10 transition metal;
L is a Lewis base;
j is 0, 1, or 2;
X is an anionic ligand;
k is 0, 1, or 2; and
$R^1$, $R^2$, $R^3$, and $R^4$ are independently selected from hydrogen, substituted or unsubstituted $C_1$-$C_{30}$ hydrocarbyl, —CN, —NR'$_2$, —OR', halogen, —NO$_2$, —SiR'$_3$, five-, six-, or seven-membered heterocyclyl (where each R' is independently hydrogen, $C_1$-$C_{30}$ hydrocarbyl, and R' is optionally substituted by halogen, or two R' radicals optionally bond to form a five- or six-membered ring), or —SiR"$_3$, —SiR"$_2$(OR'''), —SiR"(OR''')$_2$, or —Si(OR''')$_3$ (where each R" and R''' is independently hydrogen, $C_1$-$C_{30}$ hydrocarbyl, or two R" radicals optionally bond to form a five- or six-membered ring);
where $R^1$, $R^2$, $R^3$, and $R^4$ are optionally substituted by halogen, —NO$_2$, —CN, —CF$_3$, —CF$_2$CF$_3$, —CH$_2$CF$_3$, —NR'$_2$, —OR', —OSi(OR')$_3$, where each R' is independently hydrogen, $C_1$-$C_{30}$ hydrocarbyl, and R' is optionally substituted by halogen, or two R' radicals optionally bond to form a five- or six-membered ring, or —SiR"$_3$ where each R" is independently hydrogen, $C_1$-$C_{30}$ hydrocarbyl, or two R" radicals optionally bond to form a five- or six-membered ring; and
the activator is represented by the Formula (II):

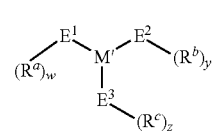

(II)

wherein:
M' is selected from boron, aluminum, or gallium;
$E^1$, $E^2$, and $E^3$ are independently selected from oxygen, nitrogen, phosphorus, sulfur or halogen;
$R^a$, $R^b$, and $R^c$ are independently selected from a $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 30 carbon atoms, alkylaryl where alkyl has from 1 to 10 carbon atoms and aryl has from 6 to 30 carbon atoms, a support material, or two or more of $R^a$, $R^b$, and $R^c$ are optionally bonded to form a five-, six- or seven-membered carbocyclic or heterocyclic ring, the heterocyclic ring comprising at least one atom from the group consisting of N, P, O and S;
where $R^a$, $R^b$, and $R^c$ are optionally substituted by halogen, —NO$_2$, —CF$_3$, —CF$_2$CF$_3$, —CH$_2$CF$_3$, —NR'$_2$, —OR' (where each R' is independently hydrogen, $C_1$-$C_{22}$-hydrocarbyl, and R' is optionally substituted by halogen, or two R' radicals optionally bond to form a five- or six-membered ring), or —SiR"$_3$ (where each R" is independently hydrogen, $C_1$-$C_{22}$-hydrocarbyl, or two R" radicals optionally bond to form a five- or six-membered ring);
w is 0 if $E^1$ is a halogen, y is 0 if $E^2$ is a halogen, and z is 0 if $E^3$ is a halogen;
w is 1 if $E^1$ is oxygen or sulfur and w is 2 if E is nitrogen or phosphorus;
y is 1 if $E^2$ is oxygen or sulfur and y is 2 if $E^2$ is nitrogen or phosphorus; and
z is 1 if $E^3$ is oxygen or sulfur and z is 2 if $E^3$ is nitrogen or phosphorus.
2. The catalyst system of paragraph 1, wherein M is selected from Ni, Fe, or Co.

3. The catalyst system of any of paragraphs 1 to 2, wherein M is Ni.

4. The catalyst system of any of paragraphs 1 to 3, wherein X is selected from a halogen, alkoxy, methyl, ethyl, propyl, benzyl, phenyl, or naphthyl.

5. The catalyst system of any of paragraphs 1 to 4, wherein X is a phenyl.

6. The catalyst system of any of paragraphs 1 to 5, wherein L is selected from an imine, an amine, a phosphine, a nitrile, an ether, a thioether, a sulfoxide, or a carbene.

7. The catalyst system of any of paragraphs 1 to 6, wherein L is a phosphine.

8. The catalyst system of any of paragraphs 1 to 7, wherein L is triphenylphosphine.

9. The catalyst system of any of paragraphs 1 to 8, wherein $R^3$ and $R^4$ together form an aryl.

10. The catalyst system of any of paragraphs 1 to 9, wherein $R^1$ is an aryl.

11. The catalyst system of any of paragraphs 1 to 10, wherein $R^1$ comprises a 2,6-substituted aryl.

12. The catalyst system of paragraph 11, wherein the 2,6 substituted aryl is a 2,4,6-substituted aryl.

13. The catalyst system of any of paragraphs 1 to 12, wherein $R^1$ is 2,6-(diphenylmethyl)-4-methylphenyl.

14. The catalyst system of any of paragraphs 1 to 13, wherein $R^2$ is a hydrogen.

15. The catalyst system of any of paragraphs 1 to 14, wherein M' is aluminum.

16. The catalyst system of paragraph 1, wherein the catalyst represented by Formula (I) is selected from:

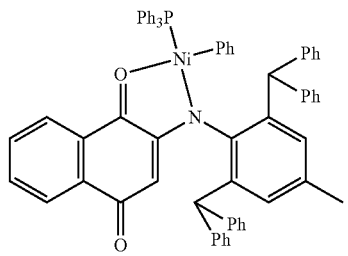

1

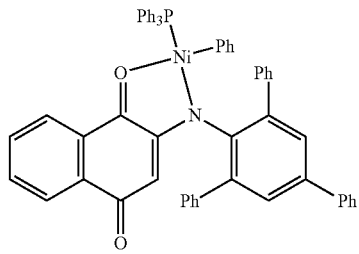

2

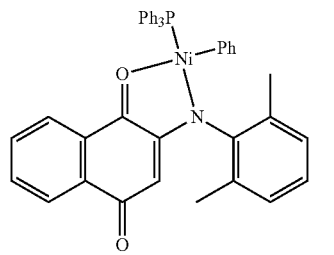

3

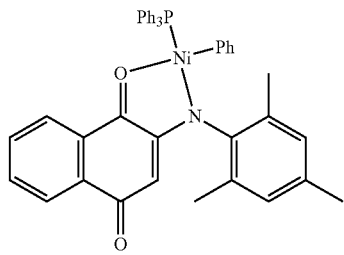

4

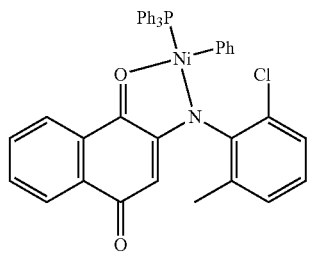

5

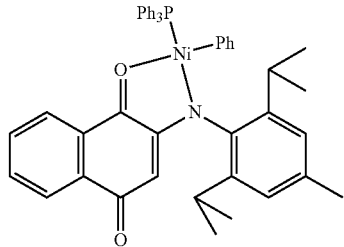

6

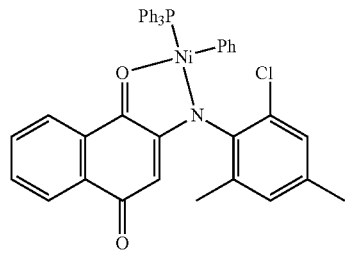

7

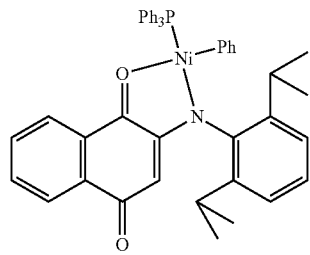

8

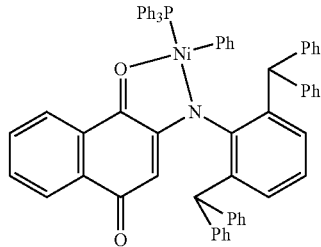

9

10
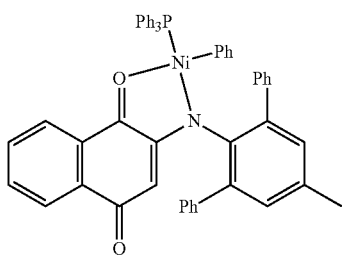
11
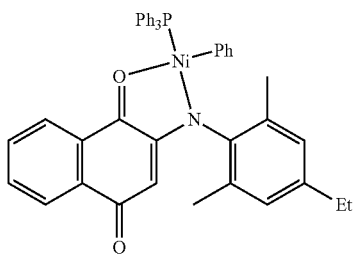
12
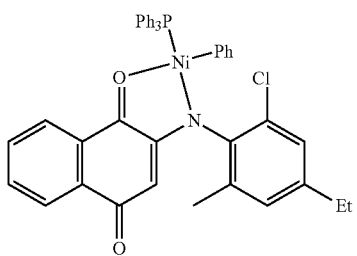
13
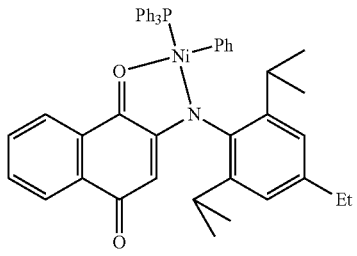
14
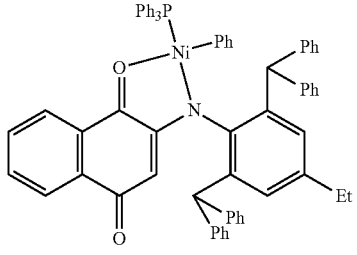
15
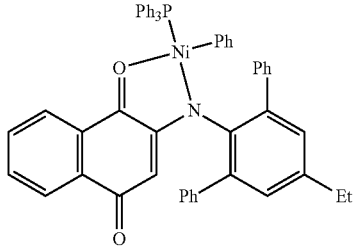
16
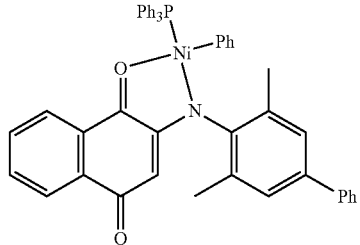
17
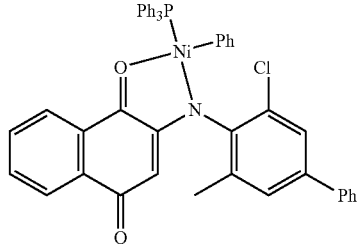
18
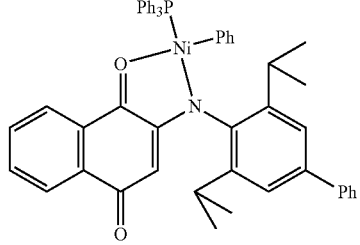
19
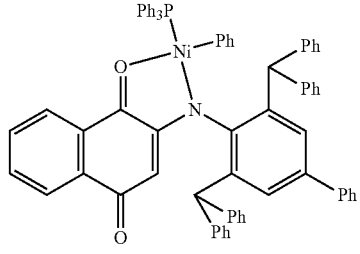
20
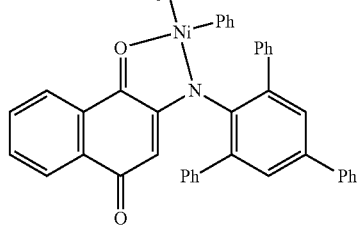
21
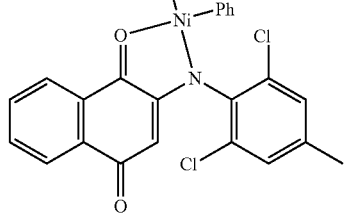

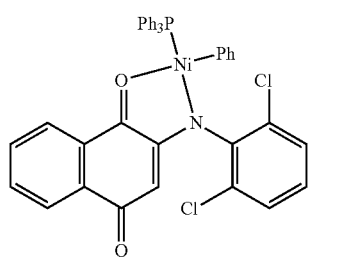
22
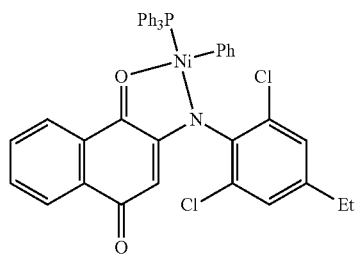
23
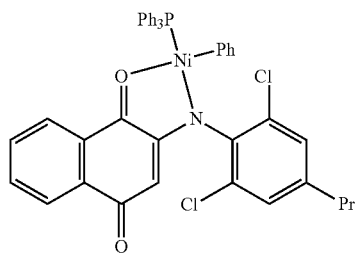
24
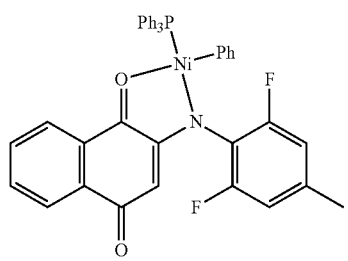
25
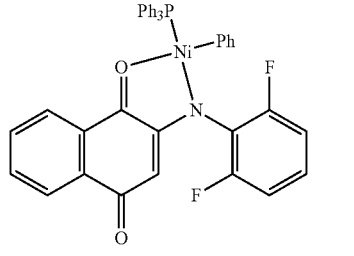
26
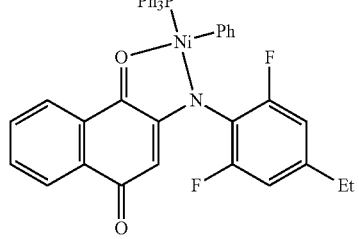
27
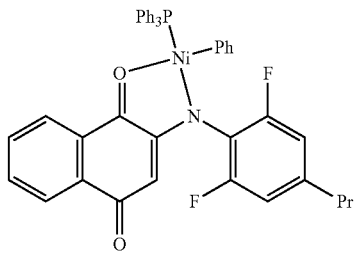
28
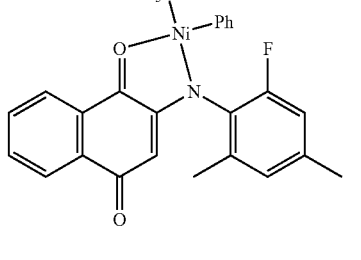
29
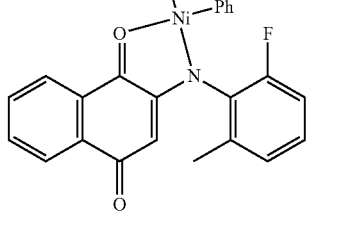
30
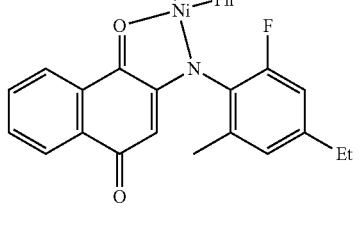
31
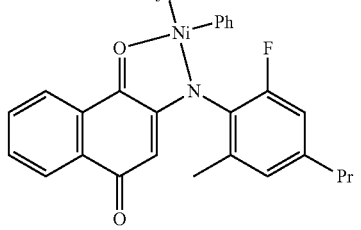
32
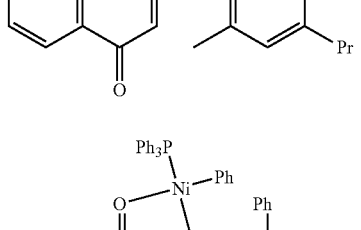
33
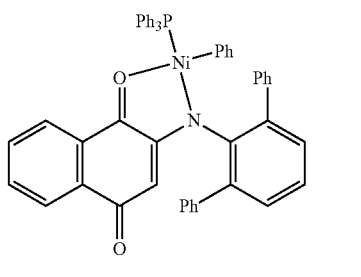

17. The catalyst system of paragraph 16, wherein the catalyst represented by Formula (I) is selected from:

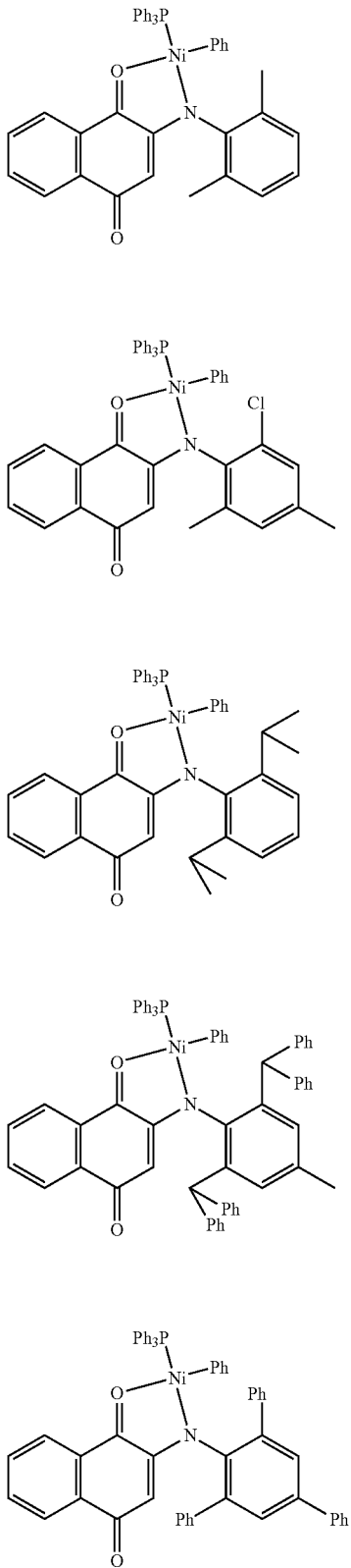

18. The catalyst system of paragraph 16, wherein the catalyst represented by Formula (I) is selected from:

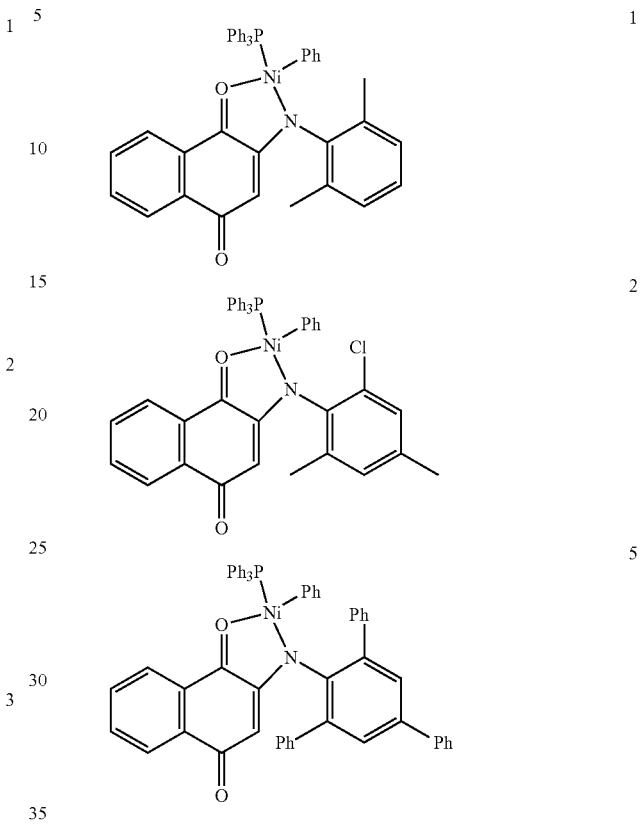

19. The catalyst system of any of paragraphs 1 to 18, wherein $E^1$, $E^2$, and $E^3$ are oxygen.

20. The catalyst system of any of paragraphs 1 to 19, wherein $R^a$, $R^b$, and $R^c$ have the same chemical structure.

21. The catalyst system of any of paragraphs 1 to 20, wherein $R^a$, $R^b$, and $R^c$ are perfluorophenyl.

22. The catalyst system of any of paragraphs 1 to 21, wherein at least one of $R^a$, $R^b$, or $R^c$ is selected from silica or alumina.

23. The catalyst system of any of paragraphs 1 to 22, wherein the activator is one or more of:

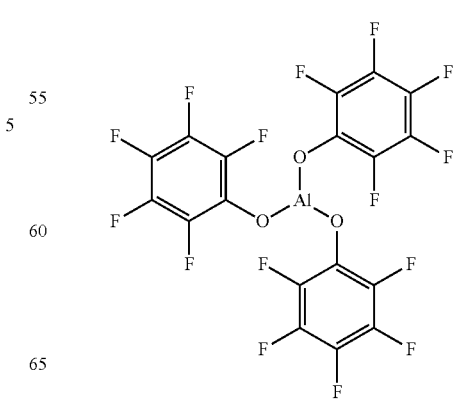

A2 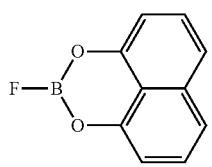
A9 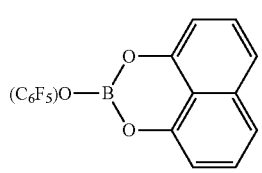
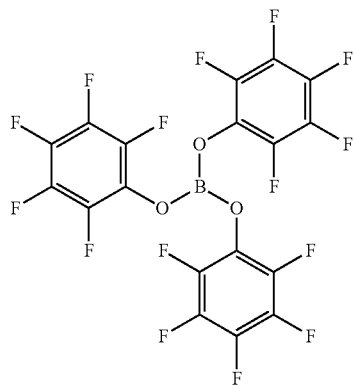
A10 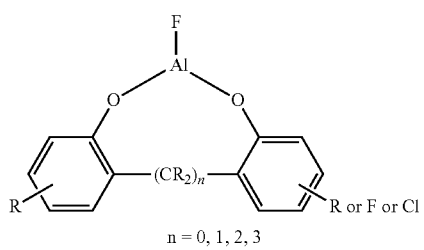
A3 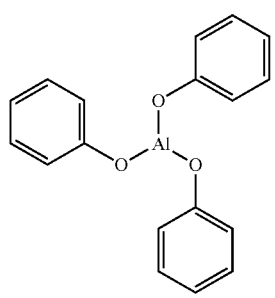
A11 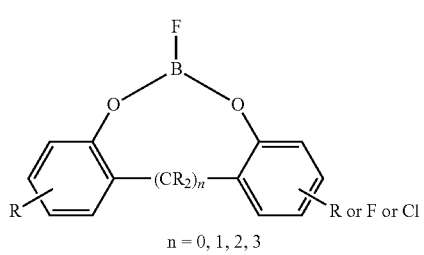
n = 0, 1, 2, 3
A4 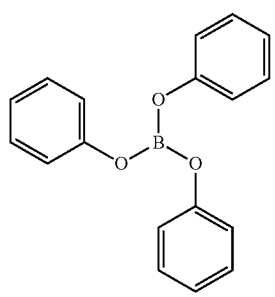
A12 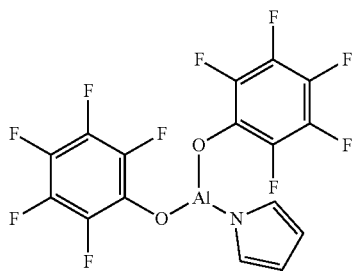
n = 0, 1, 2, 3
A7 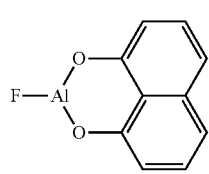
A13 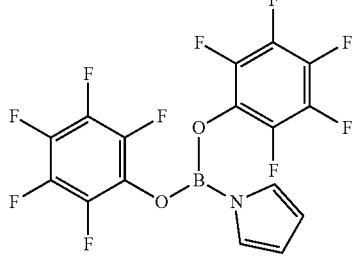
A8 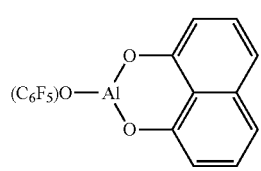
A14

-continued

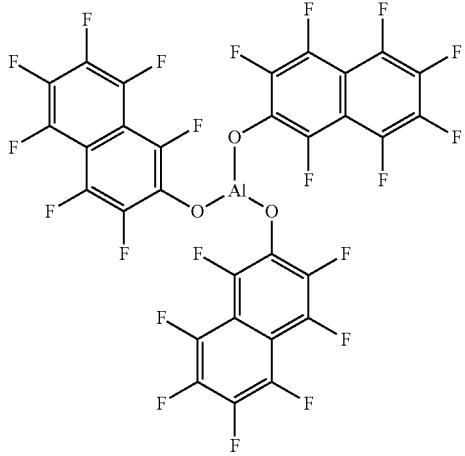

A15

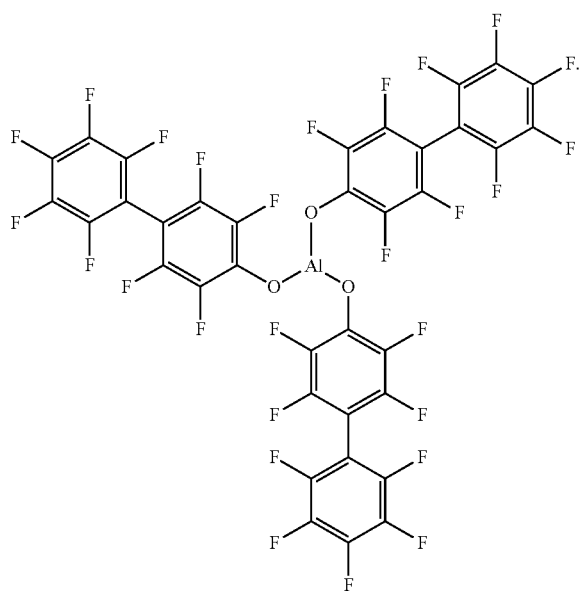

A16

24. The catalyst system of any of paragraphs 1 to 22, further comprising a physical support material.
25. The catalyst system of paragraph 24, wherein the physical support material is selected from $Al_2O_3$, $ZrO_2$, $SiO_2$, $TiO_2$, silica clay, silicon oxide/clay, or mixture(s) thereof.
26. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of paragraphs 1 to 25 in at least one gas phase reactor at a reactor pressure of from 0.7 to 70 bar and a reactor temperature of from 20° C. to 150° C. to form an ethylene alpha-olefin copolymer.
27. A process for the production of an ethylene polymer comprising: polymerizing ethylene and optionally at least one $C_3$-$C_{20}$ alpha-olefin by contacting the ethylene and the optional $C_3$-$C_{20}$ alpha-olefin with the catalyst system of paragraph 1 in a gas phase reactor at a reactor pressure of from 0.7 to 70 bar and a reactor temperature of from 20° C. to 150° C. to form an ethylene polymer.
28. The process of paragraph 26 or 27, wherein the catalyst has an activity from 50,000 gP/mmolCat/hour to 300,000 gP/mmolCat/hour.

Experimental

Unless otherwise indicated, reagents for catalyst synthesis were purchased from commercial vendors (Sigma Aldrich) and used as received unless otherwise noted. Solvents were sparged with $N_2$ and dried over 3 Å molecular sieves. All chemical manipulations were performed in a nitrogen environment unless otherwise stated. Flash column chromatography was carried out with Sigma Aldrich silica gel 60 Å (70 Mesh-230 Mesh) using solvent systems specified. All anhydrous solvents were purchased from Fisher Chemical and were degassed and dried over molecular sieves prior to use. Deuterated solvents were purchased from Cambridge Isotope Laboratories and were degassed and dried over molecular sieves prior to use. $^1$H NMR spectroscopic data were acquired at 250 MHz, 400 MHz, or 500 MHz using solutions prepared by dissolving approximately 10 mg of a sample in either $C_6D_6$, $CD_2Cl_2$, $CDCl_3$, $D_8$-toluene, or other deuterated solvent. The chemical shifts (δ) presented are relative to the residual protium in the deuterated solvent at 7.15 ppm, 5.32 ppm, 7.24 ppm, and 2.09 ppm for $C_6D_6$, $CD_2Cl_2$, $CDCl_3$, $D_8$-toluene, respectively.

Ni4 is represented by the formula:

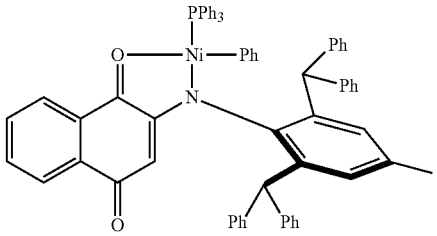

Activators A11, A12, A13 and B1 are represented by the formulas:

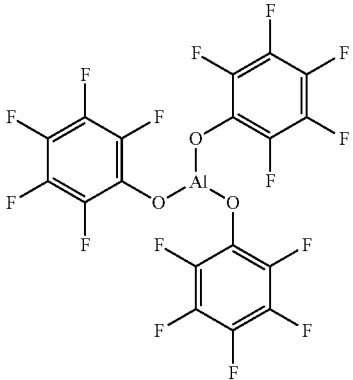

A11

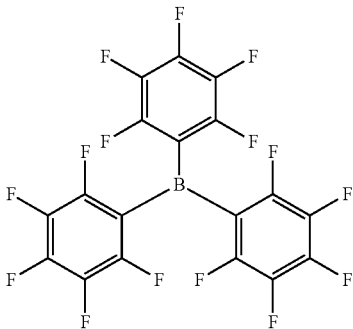

B1

-continued

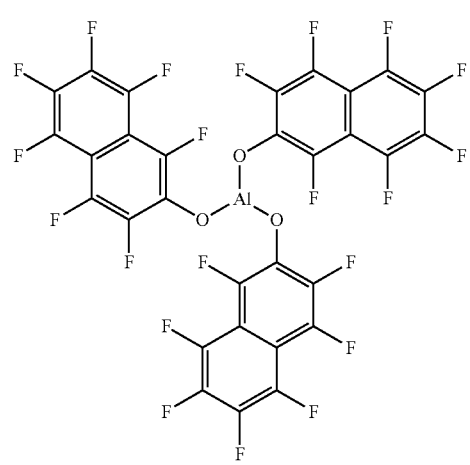

Al2

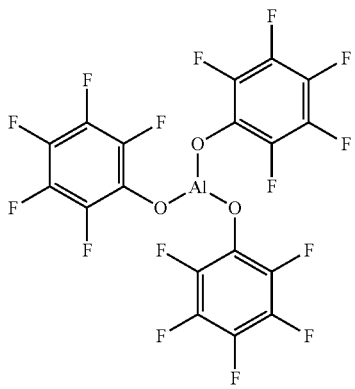

To a 30 mL toluene solution of Et₃Al (1.355 g, 11.87 mmol) was added a 20 mL toluene solution of perfluorophenol (6.335 g, 34.42 mmol) at −30° C. The mixture was heated at 60° C. for 3 hours. 100 mL pentane was added. The white solid was isolated by filtration, washed with pentane (10 mL*3), and dried under vacuum, affording A11 as a white solid (yield: 5.81 g). $^{19}F\{^{1}H\}$ (THF-d₈), δ: −164.1 (d, $J_{F-F}$=18.7 Hz, 6F), −168.3 (dd, $J_{F-F}$=18.7, 22.4 Hz, 6F), −175.7 (t, $J_{F-F}$=22.4 Hz, 3F).

A12 is tris((perfluoronaphthalen-2-yl)oxy)aluminum.

Synthesis of A12

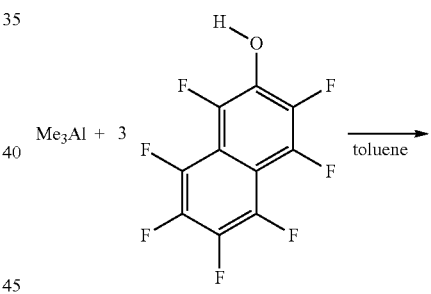

Al3

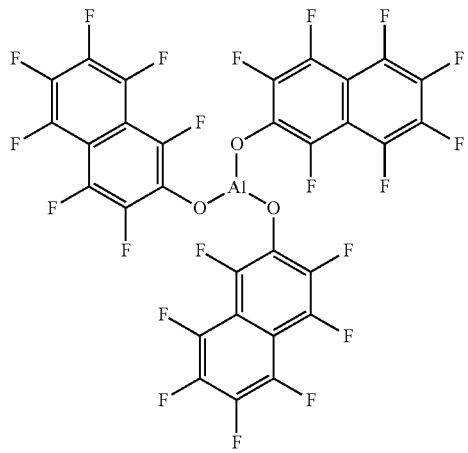

A11 is tris(perfuorophenoxy)aluminum.

Synthesis of A11

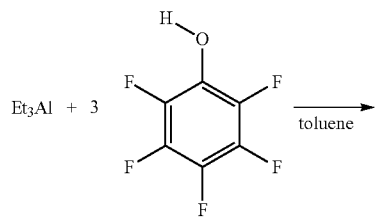

To a 1.5 mL solution of 1,3,4,5,6,7,8-heptafluoronaphthalen-2-ol (0.380 g, 1.41 mmol) was added a 1.5 mL toluene solution of Me$_3$Al (0.035 g, 0.49 mmol) at −30° C. The mixture was heated at 60° C. for 3 hours. To the reaction, 17 mL pentane was added. The tan solid was isolated by filtration, washed with pentane, and dried under vacuum, affording A12 as a tan powder (yield: 0.291 g). $^{19}$F{$^1$H} (THF), δ: −146.96 (d, $J_{F-F}$=60.9 Hz, 3F), −149.26 (m, 6F), −150.50 (m, 3F), −151.55 (s, 3F), −159.52 (t, $J_{F-F}$=15.7 Hz, 3F), −162.36 (t, $J_{F-F}$=18.3 Hz, 3F).

A13 is tris((perfluoro-[1,1'-biphenyl]-4-yl)oxy)aluminum.

Synthesis of A13

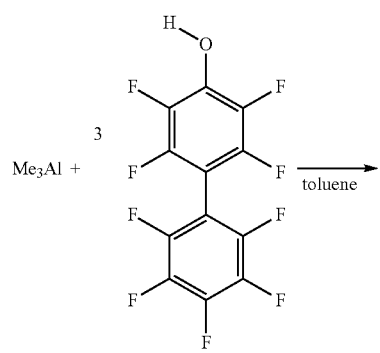

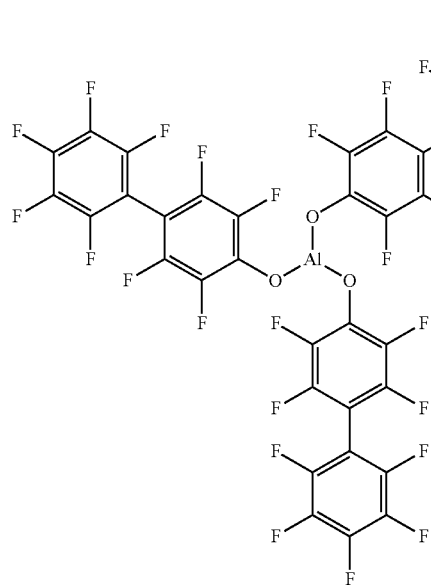

To a 1.5 mL solution of 2,2',3,3',4',5,5',6,6'-nonafluoro-[1,1'-biphenyl]-4-ol (0.668 g, 2.01 mmol) was added a 1.5 mL toluene solution of Me$_3$Al (0.050 g, 0.69 mmol) at −30° C. The mixture was heated at 60° C. for 3 hours. To the reaction, 17 mL pentane was added. The white solid was isolated by filtration, washed with pentane, and dried under vacuum, affording A13 as a white powder (yield: 0.508 g). $^{19}$F{$^1$H} (THF), δ: −139.86 (m, 6F), −143.48 (s, 6F), −154.00(t, $J_{F-F}$=20.7, 3F), −162.13 (d, $J_{F-F}$=14.8, 6F), −163.29 (t, $J_{F-F}$=18.9, 6F). MAO is methylalumoxane.

B1 is tris(perfluorophenyl)boron (B1) and was purchased from Boulder Scientific Company.

Synthesis of Ligands and Catalysts (or Complexes)

Synthesis of Ligand L4

Note: all ligands were synthesized in a similar manner

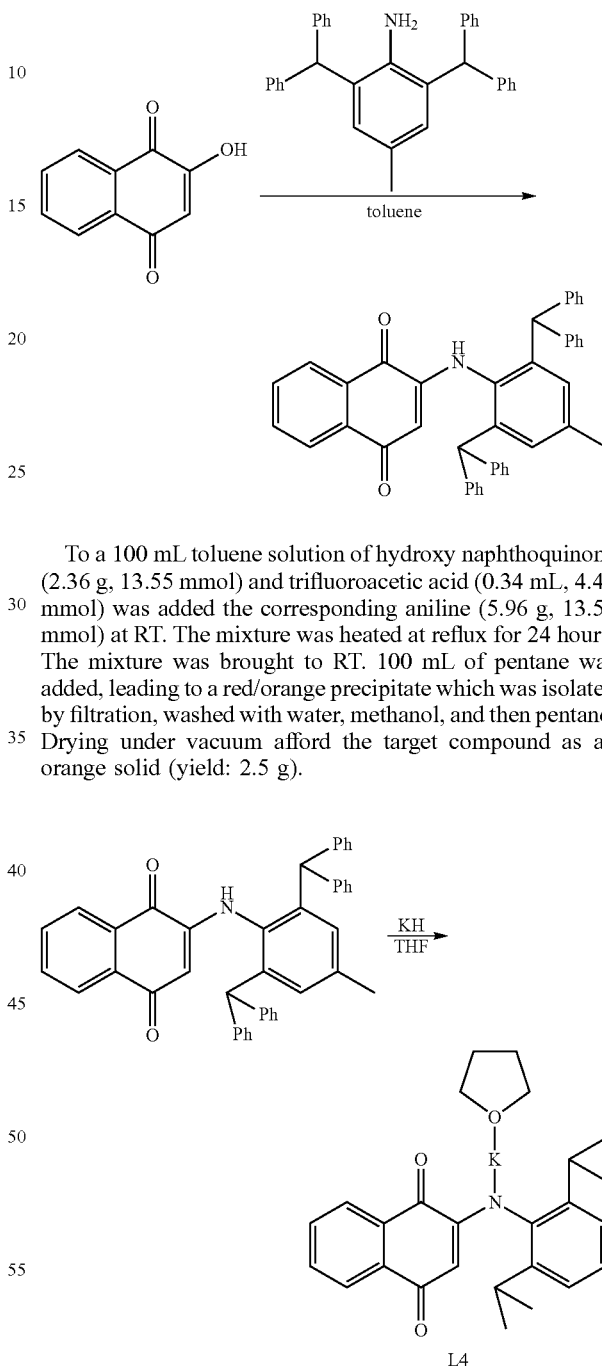

To a 100 mL toluene solution of hydroxy naphthoquinone (2.36 g, 13.55 mmol) and trifluoroacetic acid (0.34 mL, 4.47 mmol) was added the corresponding aniline (5.96 g, 13.55 mmol) at RT. The mixture was heated at reflux for 24 hours. The mixture was brought to RT. 100 mL of pentane was added, leading to a red/orange precipitate which was isolated by filtration, washed with water, methanol, and then pentane. Drying under vacuum afford the target compound as an orange solid (yield: 2.5 g).

To an 8 mL THF solution containing the precursor aniline (1 g, 1.68 mmol) was added a 2 mL THF slurry of KH (67.3 mg, 1.68 mmol) at RT. The reaction was allowed to stir at RT for 23 hours to give a purple solution. THF was removed under reduced pressure to afford a purple solid which was washed with diethyl ether and pentane, and dried under vacuum to afford L4 (yield: 1.02 g).

Synthesis of amidoanthraquinone nickel complex Ni4.

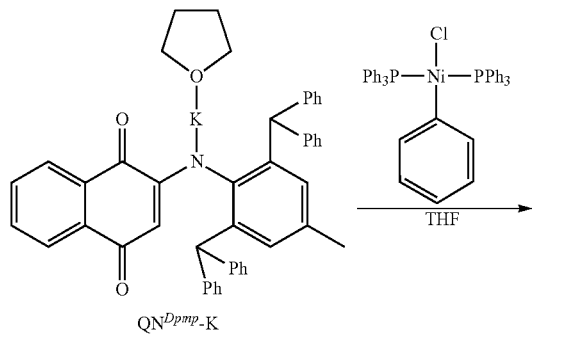

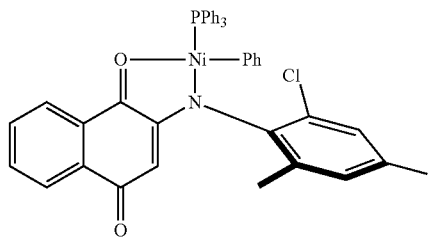

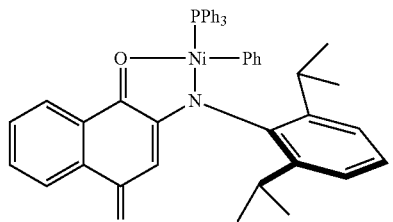

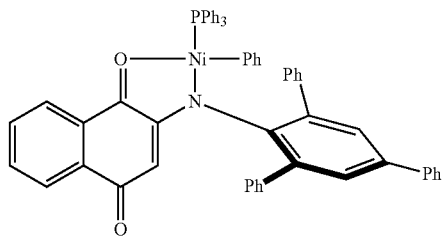

Synthesis of Ni4.

To a 2 mL THF suspension of ligand QN$^{Dpmp}$-K (100 mg, 0.142 mmol) was added a 3 mL THF solution of (PPh$_3$)$_2$NiPhCl at −30° C. The reaction was allowed to slowly warm up to RT and stirred for 12 hours at RT. The solvent was removed under reduced pressures. The residue was washed with 15 mL of hexane. To the washed solid was added 10 mL of benzene, and the insoluble salts were removed via filtration through a short plug of Celite. Solvents were again removed under reduced pressure, affording a dark purple solid. Recrystallization using THF and pentane afford purple crystals of Ni4 (86 mg, 61% yield). $^1$H NMR (THF-d$_8$), δ: 7.61-7.55 (m, 2H), 7.51-7.44 (m, 9H), 7.39-7.35 (m, 6H), 7.24 (d, J$_{H-H}$=7.6 Hz, 4H), 7.19-7.02 (m, 7H), 6.96-6.89 (m, 8H), 6.73 (t, J$_{H-H}$=7.5 Hz, 2H), 6.67 (d, J$_{H-H}$=7.2 Hz, 2H), 6.56 (bs, 2H), 6.43 (t, J$_{H-H}$=7.5 Hz, 1H), 6.35 (t, J$_{H-H}$=7.3 Hz, 1H), 6.20 (t, J$_{H-H}$=7.6 Hz, 1H), 6.06 (bs, 2H), 4.01 (s, 1H), 2.00 (s, 3H). $^{31}$P{H} NMR (THF-d$_8$), δ:27.7.

Ni1, Ni2, Ni3, and Ni5 were prepared in a similar fashion to Ni4 above.

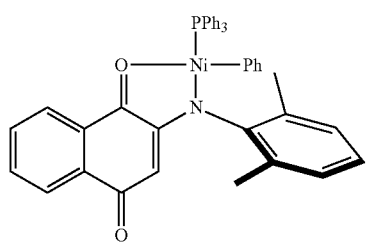

General Polymerization Procedures for Parallel Pressure Reactor.

Solvents, polymerization-grade toluene, and isohexane were supplied by ExxonMobil Chemical Company and purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company). 1-octene (C8) and 1-hexene (C6) (98%, Aldrich Chemical Company) were dried by stirring over NaK overnight followed by filtration through basic alumina (Aldrich Chemical Company, Brockman Basic 1).

Polymerization-grade ethylene (C$_2$) was used and further purified by passing the gas through a series of columns: 500 cc Oxyclear cylinder from Labclear (Oakland, Calif.) followed by a 500 cc column packed with dried 3 Å mole sieves (8-12 mesh; Aldrich Chemical Company) and a 500 cc column packed with dried 5 Å mole sieves (8-12 mesh; Aldrich Chemical Company).

Polymerizations were conducted in an inert atmosphere (N$_2$) drybox using autoclaves equipped with an external heater for temperature control, glass inserts (internal volume of reactor=23.5 mL for C$_2$ and C$_2$/C$_8$ runs; 22.5 mL for C$_3$ and C$_2$/C$_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Solutions of the metal complexes and activators were prepared in a drybox using toluene (ExxonMobil Chemical Company; anhydrous, stored under nitrogen; 98%). Concentrations are typically 0.2 mmol/L for the metal complexes, 0.2 mmol/L for Activators, and 0.5% w/w for methyl alumoxane (MAO) purchased from Albemarle, if MAO was used. For polymerizations, a pre-weighed glass vial insert and disposable stirring paddle were fitted to each reaction vessel within the reactor. The reactor was then closed and each vessel was individually heated to the desired temperature and pressurized to 120 psi. The contents of the vessel were then stirred at 800 rpm. An activator solution in toluene (molar equivalents shown in Table 1 are relative to the precatalyst complex) was then injected into the reaction vessel along with a 500 μL solvent chaser (isohexane unless otherwise indicated). Then a toluene solution of the dissolved catalyst compound was added along with a 500 μL solvent chaser (isohexane unless otherwise indicated).

The reaction was then allowed to proceed until either 30 psi of pressure had been taken up by the polymerization or a set amount of ethylene had been taken up by the reaction (ethylene pressure was maintained in each reaction vessel at the pre-set level by computer control; in the event the uptake is less than 30 psi, the reaction is quenched at 1,200 or 1,800 seconds). At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (described below) to determine the molecular weight and Differential Scanning Calorimetry (described below) to determine melting point. The results demonstrate that Catalyst systems and methods of the present disclosure can provide highly active catalysts capable of operating at high reactor temperatures (100° C. demonstrated) with reduced quantities of activator (as low as 1.1 equivalents) while producing polymers with controlled molecular weights (high Mw's, such as greater than 1 million, and narrow Mw/Mn).

Yields reported include total weight of polymer and residual catalyst.

Catalyst activity is reported as grams of polymer per mmol transition metal compound per hour of reaction time (g/mmol/hr).

Table 1 illustrates ethylene polymerization results obtained using a catalyst Ni4:

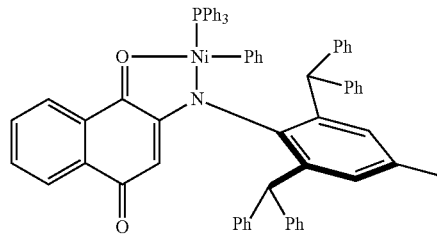

20 nmol of catalyst compound and activator (Lewis Acid listed in Table 1), 120 psig ethylene, were diluted with isohexane to a total liquid volume of 5 mL and held at 40, 70, or 100° C. In all cases, narrow Mw/Mn was obtained (from 1.6 to 8). The greatest activity was achieved with the addition 10, 20, or 50 equivalents of tris(perfluorophenoxy) aluminum (Al1). Relatively low catalyst activity was achieved with the addition of 50 to 400 equivalents of methylalumoxane (MAO). Furthermore, addition of tris (perfluorophenyl)boron (B1) also

TABLE 1

(Ethylene polymerizations for Ni4, pressure = 120 psi ethylene, volume = 5 mL, solvent = isohexane, catalyst = 0.02 micromol.) Lewis acid equivalents were calculated with respect to the catalyst. For MAO, this number is based on Al. Reaction quenched at 30 psi uptake or 1,200 seconds, whichever condition was first met. Run 15 was quenched at 1,800 seconds.

| Run | Lewis acid (equiv) | quench time (s) | yield (mg) | activity (kg mol$^{-1}$ h$^{-1}$) | Polym. Temp (° C.) |
|---|---|---|---|---|---|
| 1 | no | 588 | 57.5 | 17,602 | 100 |
| 2 | MAO (50) | 1200 | 17.6 | 2,640 | 100 |
| 3 | MAO (100) | 1200 | 10.1 | 1,515 | 100 |
| 4 | Al1 (1.1) | 1200 | 45.4 | 6,810 | 100 |
| 5 | Al1 (2) | 361 | 51.9 | 25,878 | 100 |
| 6 | Al1 (5) | 136 | 56.5 | 74,779 | 100 |
| 7 | Al1 (10) | 81 | 73.0 | 162,222 | 100 |
| 8 | Al1 (20) | 75 | 57.9 | 138,960 | 100 |
| 9 | Al1 (50) | 49 | 70.0 | 257,143 | 100 |
| 10 | none | 1200 | 54.0 | 8,100 | 70 |
| 11 | MAO (50) | 1200 | 56.7 | 8,505 | 70 |
| 12 | MAO (400) | 1200 | 11.7 | 1,755 | 70 |
| 13 | B1 (1.1) | 1200 | 43.8 | 6,570 | 70 |
| 14 | B1 (10) | 1200 | 41.4 | 6,210 | 70 |
| 15 | Al1 (1.1) | 1800 | 42.1 | 4,210 | 70 |
| 16 | Al1 (2) | 325 | 50.8 | 28,135 | 70 |
| 17 | Al1 (3) | 475 | 79.7 | 30,202 | 70 |
| 18 | Al1 (5) | 207 | 71.5 | 62,174 | 70 |
| 19 | Al1 (10) | 95 | 79.4 | 150,442 | 70 |
| 20 | Al1 (20) | 86 | 114.0 | 238,605 | 70 |
| 21 | Al1 (30) | 115 | 125.2 | 195,965 | 70 |
| 22 | Al1 (50) | 73 | 125.1 | 308,466 | 70 |
| 23 | no | 1200 | 145.7 | 21,855 | 40 |
| 24 | MAO (50) | 1200 | 74.5 | 11,175 | 40 |
| 25 | B1 (1.1) | 1200 | 18.8 | 2,820 | 40 |
| 26 | B1 (10) | 1200 | 36.6 | 5,490 | 40 |
| 27 | Al1 (1.1) | 1200 | 25.3 | 3,795 | 40 |
| 28 | Al1 (2) | 1402 | 47.5 | 6,098 | 40 |
| 29 | Al1 (3) | 1301 | 43.8 | 6,060 | 40 |
| 30 | Al1 (5) | 1042 | 63.2 | 10,917 | 40 |
| 31 | Al1 (10) | 343 | 67.5 | 35,423 | 40 |
| 32 | Al1 (20) | 317 | 82.0 | 46,562 | 40 |
| 33 | Al1 (30) | 198 | 142.3 | 129,364 | 40 |
| 34 | Al1 (50) | 400 | 193.9 | 87,255 | 40 |
| 35 | Al2 (1.1) | 1333 | 43.3 | 5,847 | 40 |
| 36 | Al2 (1.1) | 513 | 51.8 | 18,175 | 70 |
| 37 | Al2 (1.1) | 1800 | 47.8 | 4,780 | 100 |
| 38 | Al3 (1.1) | 1019 | 55.3 | 9,768 | 100 |
| 39 | Al3 (1.1) | 237 | 55.5 | 42,152 | 70 |
| 40 | Al3 (1.1) | 1161 | 46.6 | 7,225 | 40 |
| 41 | Al2 (2.0) | 340 | 25.9 | 13,712 | 40 |
| 42 | Al2 (2.0) | 119 | 83.6 | 126,454 | 70 |
| 43 | Al2 (2.0) | 51 | 77.8 | 274,588 | 100 |
| 44 | Al3 (2.0) | 47 | 79.7 | 305,234 | 100 |
| 45 | Al3 (2.0) | 116 | 87.2 | 135,310 | 70 |
| 46 | Al3 (2.0) | 702 | 83.3 | 21,359 | 40 |
| 47 | Al2 (3.0) | 654 | 98.0 | 26,972 | 40 |
| 48 | Al2 (3.0) | 111 | 92.9 | 150,649 | 70 |
| 49 | Al2 (3.0) | 46 | 72.7 | 284,478 | 100 |
| 50 | Al3 (3.0) | 46 | 75.5 | 295,435 | 100 |
| 51 | Al3 (3.0) | 84 | 89.2 | 191,143 | 70 |
| 52 | Al3 (3.0) | 279 | 84.5 | 54,516 | 40 |
| 53 | Al2 (5.0) | 180 | 71.3 | 71,300 | 40 |
| 54 | Al2 (5.0) | 145 | 133.3 | 165,476 | 70 |
| 55 | Al2 (5.0) | 49 | 72.4 | 265,959 | 100 |
| 56 | Al3 (5.0) | 42 | 71.5 | 306,429 | 100 |
| 57 | Al3 (5.0) | 159 | 139.2 | 157,585 | 70 |
| 58 | Al3 (5.0) | 155 | 147.0 | 170,710 | 40 |
| 59 | Al2 (10.0) | 168 | 164.7 | 176,464 | 40 |
| 60 | Al2 (10.0) | 227 | 139.6 | 110,696 | 70 |
| 61 | Al2 (10.0) | 37 | 83.2 | 404,757 | 100 |
| 62 | Al3 (10.0) | 31 | 78.6 | 456,387 | 100 |
| 63 | Al3 (10.0) | 127 | 130.2 | 184,535 | 70 |
| 64 | Al3 (10.0) | 246 | 208.8 | 152,780 | 40 |
| 65 | Al2 (30.0) | 167 | 188.9 | 203,605 | 40 |

TABLE 1-continued (Ethylene polymerizations for Ni4, pressure = 120 psi ethylene, volume = 5 mL, solvent = isohexane, catalyst = 0.02 micromol.) Lewis acid equivalents were calculated with respect to the catalyst. For MAO, this number is based on Al. Reaction quenched at 30 psi uptake or 1,200 seconds, whichever condition was first met. Run 15 was quenched at 1,800 seconds.

| Run | Lewis acid (equiv) | quench time (s) | yield (mg) | activity (kg mol$^{-1}$ h$^{-1}$) | Polym. Temp (° C.) |
|---|---|---|---|---|---|
| 66 | Al2 (30.0) | 113 | 123.9 | 197,363 | 70 |
| 67 | Al2 (30.0) | 38 | 72.4 | 342,947 | 100 |
| 68 | Al3 (30.0) | 36 | 74.3 | 371,500 | 100 |
| 69 | Al3 (30.0) | 163 | 129.0 | 142,454 | 70 |
| 70 | Al3 (30.0) | 143 | 200.0 | 251,748 | 40 |
| 71 | Al2 (50.0) | 145 | 186.1 | 231,021 | 40 |
| 72 | Al2 (50.0) | 76 | 117.2 | 277,579 | 70 |
| 73 | Al2 (50.0) | 37 | 76.6 | 372,649 | 100 |
| 74 | Al3 (50.0) | 36 | 76.8 | 384,000 | 100 |
| 75 | Al3 (50.0) | 99 | 118.5 | 215,455 | 70 |
| 76 | Al3 (50.0) | 167 | 200.2 | 215,784 | 40 |
| 77 | Al1 (2.0) | 253 | 52.7 | 37,494 | 70 |
| 78 | Al1 (1.4); Al3 (0.7) | 207 | 56.2 | 48,870 | 70 |
| 79 | Al1 (0.7); Al3 (1.4) | 255 | 63.9 | 45,106 | 70 |
| 80 | Al3 (2.0) | 120 | 62.4 | 93,600 | 70 |
| 81 | Al1 (3.1) | 132 | 74.6 | 101,727 | 70 |
| 82 | Al1 (2.1); Al3 (1.1) | 121 | 72.4 | 107,702 | 70 |
| 83 | Al1 (1.1); Al3 (2.1) | 119 | 72.2 | 109,210 | 70 |
| 84 | Al3 (3.1) | 104 | 78.1 | 135,173 | 70 |
| 85 | Al1 (4.9) | 112 | 74.5 | 119,732 | 70 |
| 86 | Al1 (3.3); Al3 (1.7) | 103 | 75.5 | 131,942 | 70 |
| 87 | Al1 (1.7); Al3 (3.3) | 108 | 68.3 | 113,833 | 70 |
| 88 | Al3 (4.9) | 67 | 119.3 | 320,507 | 70 |
| 89 | Al1 (7.7) | 107 | 74.0 | 124,486 | 70 |
| 90 | Al1 (5.2); Al3 (2.6) | 82 | 114.9 | 252,220 | 70 |
| 91 | Al1 (2.6); Al3 (5.2) | 128 | 123.5 | 173,672 | 70 |
| 92 | Al3 (7.7) | 110 | 124.9 | 204,382 | 70 |
| 93 | Al1 (12.3) | 88 | 131.4 | 268,773 | 70 |
| 94 | Al1 (8.2); Al3 (4.1) | 127 | 133.8 | 189,638 | 70 |
| 95 | Al1 (4.1); Al3 (8.2) | 83 | 125.6 | 272,386 | 70 |
| 96 | Al3 (12.3) | 120 | 106.0 | 159,000 | 70 |
| 97 | Al1 (19.6) | 93 | 124.4 | 240,774 | 70 |
| 98 | Al1 (13.1); Al3 (6.5) | 72 | 131.4 | 328,500 | 70 |
| 99 | Al1 (6.5); Al3 (13.1) | 74 | 125.4 | 305,027 | 70 |
| 100 | Al3 (19.6) | 123 | 118.6 | 173,561 | 70 |
| 101 | Al1 (31.3) | 78 | 127.7 | 294,692 | 70 |
| 102 | Al1 (20.9); Al3 (10.4) | 134 | 126.1 | 169,388 | 70 |
| 103 | Al1 (10.4); Al3 (20.9) | 85 | 121.2 | 256,659 | 70 |
| 104 | Al3 (31.3) | 132 | 117.4 | 160,091 | 70 |
| 105 | Al1 (50.0) | 41 | 116.9 | 513,220 | 70 |
| 106 | Al1 (33.4); Al3 (16.7) | 48 | 114.4 | 429,000 | 70 |
| 107 | Al1 (16.7); Al3 (33.4) | 40 | 107.2 | 482,400 | 70 |
| 108 | Al3 (50.0) | 83 | 110.5 | 239,639 | 70 |

TABLE 1A

| Run | $M_w$ (g/mol) | $M_n$ (g/mol) | Mw/Mn | Melting point (Tm, ° C.) |
|---|---|---|---|---|
| 1 | 698,310 | 402,464 | 1.7 | 107 |
| 2 | 269,356 | 90,096 | 3.0 | 120 |
| 3 | 238,822 | 98,964 | 2.4 | 118 |
| 4 | 183,069 | 105,364 | 1.7 | 112 |
| 5 | 87,986 | 44,025 | 2.0 | 117 |
| 6 | 94,809 | 51,622 | 1.8 | 115 |
| 7 | 120,902 | 74,680 | 1.6 | 113 |
| 8 | 162,133 | 73,947 | 2.2 | 111 |
| 9 | 377,539 | 121,258 | 3.1 | 106 |
| 10 | 2,619,432 | 1,076,704 | 2.4 | 128 |
| 11 | 3,275,967 | 1,414,082 | 2.3 | 128 |
| 12 | 1,780,308 | 848,055 | 2.1 | 134 |
| 13 | 827,148 | 117,038 | 7.1 | 121 |
| 14 | 197,937 | 99,629 | 2.0 | 121 |
| 15 | 1,283,786 | 297,675 | 4.3 | 125 |
| 16 | 1,204,836 | 213,146 | 5.7 | 125 |
| 17 | 372,261 | 162,817 | 2.3 | 124 |
| 18 | 403,981 | 177,242 | 2.3 | 123 |
| 19 | 713,063 | 335,456 | 2.1 | 121 |
| 20 | 640,477 | 219,200 | 2.9 | 118 |
| 21 | 863,414 | 225,751 | 3.8 | 115 |
| 22 | 914,519 | 171,490 | 5.3 | 114 |
| 23 | 3,613,095 | 2,031,189 | 1.8 | 128 |
| 24 | 3,408,240 | 1,554,567 | 2.2 | 129 |
| 25 | 2,848,485 | 1,236,368 | 2.3 | 131 |
| 26 | 635,465 | 415,027 | 1.5 | 119 |
| 27 | 3,506,489 | 2,185,864 | 1.6 | 131 |
| 28 | 3,587,770 | 2,023,321 | 1.8 | 133 |
| 29 | 2,027,328 | 621,201 | 3.3 | 131 |
| 30 | 2,121,777 | 740,642 | 2.9 | 130 |
| 31 | 3,041,853 | 1,555,382 | 2.0 | 130 |
| 32 | 3,400,547 | 1,944,992 | 1.7 | 127 |
| 33 | 3,169,475 | 1,550,958 | 2.0 | 122 |
| 34 | 2,951,787 | 983,324 | 3.0 | 119 |
| 35 | 2,793,163 | 914,874 | 3.1 | 132 |
| 36 | 1,132,660 | 268,494 | 4.2 | 127 |
| 37 | 143,576 | 74,821 | 1.9 | 116 |
| 38 | 115,461 | 73,709 | 1.6 | 116 |
| 39 | 311,456 | 141,605 | 2.2 | 126 |
| 40 | 1,560,213 | 321,911 | 4.8 | 131 |
| 41 | 1,313,809 | 607,941 | 2.2 | 131 |
| 42 | 401,116 | 186,487 | 2.2 | 124 |
| 43 | 136,082 | 69,667 | 2.0 | 114 |
| 44 | 92,170 | 53,979 | 1.7 | 113 |
| 45 | 259,158 | 148,734 | 1.7 | 123 |
| 46 | 1,086,007 | 488,064 | 2.2 | 130 |
| 47 | 1,997,169 | 977,170 | 2.0 | 129 |
| 48 | 437,757 | 226,837 | 1.9 | 125 |
| 49 | 128,547 | 76,725 | 1.7 | 114 |
| 50 | 100,684 | 56,830 | 1.8 | 116 |
| 51 | 365,493 | 200,670 | 1.8 | 122 |
| 52 | 2,070,777 | 921,763 | 2.2 | 127 |
| 53 | 2,839,714 | 1,371,943 | 2.1 | 128 |
| 54 | 683,762 | 227,564 | 3.0 | 119 |
| 55 | 143,902 | 72,950 | 2.0 | 113 |
| 56 | 108,405 | 54,243 | 2.0 | 113 |
| 57 | 605,124 | 232,783 | 2.6 | 118 |
| 58 | 2,618,198 | 1,105,092 | 2.4 | 123 |
| 59 | 3,032,892 | 1,242,859 | 2.4 | 122 |
| 60 | 897,302 | 275,133 | 3.3 | 116 |
| 61 | 189,297 | 84,233 | 2.2 | 110 |
| 62 | 181,103 | 83,631 | 2.2 | 109 |
| 63 | 718,917 | 229,295 | 3.1 | 115 |
| 64 | 2,061,058 | 495,808 | 4.2 | 119 |
| 65 | 2,682,755 | 265,737 | 10.1 | 120 |
| 66 | 1,150,027 | 290,057 | 4.0 | 115 |
| 67 | 227,562 | 116,992 | 1.9 | 107 |
| 68 | 227,146 | 112,914 | 2.0 | 108 |
| 69 | 1,012,364 | 439,328 | 2.3 | 113 |
| 70 | 2,294,968 | 595,326 | 3.9 | 119 |
| 71 | 3,161,961 | 1,044,878 | 3.0 | 120 |
| 72 | 1,229,039 | 286,184 | 4.3 | 114 |
| 73 | 309,848 | 136,570 | 2.3 | 107 |
| 74 | 316,572 | 128,245 | 2.5 | 107 |
| 75 | 942,967 | 184,299 | 5.1 | 113 |
| 76 | 2,670,861 | 795,522 | 3.4 | 119 |

TABLE 1A-continued

| Run | $M_w$ (g/mol) | $M_n$ (g/mol) | Mw/Mn | Melting point (Tm, °C.) |
|---|---|---|---|---|
| 77 | 405,143 | 193,712 | 2.1 | 126 |
| 78 | 427,669 | 179,517 | 2.4 | 126 |
| 79 | 475,409 | 189,259 | 2.5 | 126 |
| 80 | 352,835 | 164,648 | 2.1 | 125 |
| 81 | 409,169 | 192,102 | 2.1 | 124 |
| 82 | 420,539 | 176,079 | 2.4 | 124 |
| 83 | 356,793 | 162,248 | 2.2 | 124 |
| 84 | 419,585 | 193,197 | 2.2 | 123 |
| 85 | 447,623 | 230,501 | 1.9 | 124 |
| 86 | 398,957 | 195,347 | 2.0 | 124 |
| 87 | 376,733 | 196,525 | 1.9 | 123 |
| 88 | 465,471 | 224,949 | 2.1 | 120 |
| 89 | 440,537 | 205,906 | 2.1 | 124 |
| 90 | 542,999 | 252,047 | 2.2 | 120 |
| 91 | 732,515 | 345,522 | 2.1 | 118 |
| 92 | 677,561 | 248,830 | 2.7 | 118 |
| 93 | 538,387 | 160,423 | 3.4 | 116 |
| 94 | 634,311 | 245,910 | 2.6 | 117 |
| 95 | 671,701 | 240,393 | 2.8 | 115 |
| 96 | 754,920 | 303,952 | 2.5 | 115 |
| 97 | 594,510 | 222,713 | 2.7 | 116 |
| 98 | 617,762 | 224,932 | 2.7 | 115 |
| 99 | 573,983 | 194,092 | 3.0 | 114 |
| 100 | 791,206 | 264,107 | 3.0 | 115 |
| 101 | 699,546 | 225,703 | 3.1 | 115 |
| 102 | 717,360 | 244,238 | 2.9 | 115 |
| 103 | 704,034 | 236,716 | 3.0 | 114 |
| 104 | 874,025 | 379,002 | 2.3 | 114 |
| 105 | 707,240 | 216,896 | 3.3 | 114 |
| 106 | 623,188 | 166,818 | 3.7 | 114 |
| 107 | 662,174 | 198,902 | 3.3 | 114 |
| 108 | 797,247 | 280,481 | 2.8 | 115 |

TABLE 2

(Ethylene polymerizations for Ni2, pressure = 120 psi ethylene, volume = 5 mL, solvent = isohexane, catalyst = 0.02 micromol.) Lewis acid equivalents were calculated with respect to the catalyst. For MAO, this number is based on Al. Reaction quenched at 30 psi uptake or 1,200 seconds, whichever condition was first met.

| Run | Lewis acid (equiv) | quench time (s) | yield (mg) | activity (kg mol$^{-1}$ h$^{-1}$) | Temp (°C.) | $M_w$ (g/mol) | $M_n$ (g/mol) | Mw/Mn | Melting point (Tm, °C.) |
|---|---|---|---|---|---|---|---|---|---|
| 1 | no | 1200 | 11.2 | 1,680 | 70 | 63,349 | 33,353 | 1.9 | 101 |
| 2 | B1 (10) | 657 | 49.0 | 13,425 | 70 | 4,874 | 2,590 | 1.9 | 97 |
| 3 | Al1 (10) | 220 | 57.6 | 47,127 | 70 | 8,885 | 4,396 | 2.0 | 116 |

TABLE 3

(Ethylene polymerizations for Ni3, pressure = 120 psi ethylene, volume = 5 mL, solvent = isohexane, catalyst = 0.02 micromol.) Lewis acid equivalents were calculated with respect to the catalyst. For MAO, this number is based on Al. Reaction quenched at 30 psi uptake or 1,200 seconds, whichever condition was first met.

| Run | Lewis acid (equiv) | quench time (s) | yield (mg) | activity (kg mol$^{-1}$ h$^{-1}$) | Temp (°C.) | $M_w$ (g/mol) | $M_n$ (g/mol) | Mw/Mn | Melting point (Tm, °C.) |
|---|---|---|---|---|---|---|---|---|---|
| 1 | MAO (50) | 1200 | 15.3 | 2,295 | 70 | 1,831,233 | 310,882 | 5.9 | 134 |
| 2 | B1 (1.1) | 439 | 29.4 | 12,055 | 70 | 13,311 | 4,695 | 2.8 | 112 |
| 3 | B1 (10) | 523 | 25.9 | 8,914 | 70 | 41,101 | 23,972 | 1.7 | 128 |
| 4 | Al1 (1.1) | 1200 | 13.2 | 1,980 | 70 | 6,460 | 3,605 | 1.8 | 128 |
| 5 | Al1 (10) | 148 | 72.2 | 87,811 | 70 | 24,430 | 10,001 | 2.4 | 108 |

TABLE 4

(Ethylene polymerizations for Ni5, pressure = 120 psi ethylene, volume = 5 mL, solvent = isohexne, catalyst = 0.02 micromol.) Lewis acid equivalents were calculated with respect to the catalyst. For MAO, this number is based on Al. Reaction quenched at 30 psi uptake or 1,800 seconds, whichever condition was first met.

| Run | Lewis acid (equiv) | quench time (s) | yield (mg) | activity (kg mol$^{-1}$ h$^{-1}$) | Temp (°C.) | $M_w$ (g/mol) | $M_n$ (g/mol) | Mw/Mn | Melting point (Tm, °C.) |
|---|---|---|---|---|---|---|---|---|---|
| 1 | no | 1800 | 41.9 | 4,190 | 70 | 273,048 | 160,557 | 1.7 | 108.5 |
| 2 | Al1 (1.1) | 1800 | 15.2 | 1,520 | 70 | 2,905 | 1,845 | 1.6 | 53 |
| 3 | Al1 (2) | 1800 | 42.6 | 4,260 | 70 | 3,336 | 2,070 | 1.6 | 52 |
| 4 | Al1 (3) | 663 | 49.3 | 13,385 | 70 | 4,986 | 2,935 | 1.7 | 51.2 |
| 5 | Al1 (5) | 376 | 50.4 | 24,128 | 70 | 6,046 | 3,274 | 1.8 | 49.7 |

TABLE 4-continued (Ethylene polymerizations for Ni5, pressure = 120 psi ethylene, volume = 5 mL, solvent = isohexne, catalyst = 0.02 micromol.) Lewis acid equivalents were calculated with respect to the catalyst. For MAO, this number is based on Al. Reaction quenched at 30 psi uptake or 1,800 seconds, whichever condition was first met.

| Run | Lewis acid (equiv) | quench time (s) | yield (mg) | activity (kg mol$^{-1}$ h$^{-1}$) | Temp (° C.) | $M_w$ (g/mol) | $M_n$ (g/mol) | Mw/Mn | Melting point (Tm, ° C.) |
|---|---|---|---|---|---|---|---|---|---|
| 6 | Al1 (10) | 168 | 58.9 | 63,107 | 70 | 8,746 | 4,672 | 1.9 | 49.2 |
| 7 | Al1 (20) | 90 | 81.0 | 162,000 | 70 | 5,767 | 3,076 | 1.9 | 48.3 |
| 8 | Al1 (30) | 69 | 87.8 | 229,043 | 70 | 5,462 | 2,987 | 1.8 | 47.7 |

TABLE 5

(Ethylene 1-hexene copolymerizations using Ni4, pressure = 120 psi ethylene, volume = 5 mL, solvent = toluene, catalyst = 0.02 micromol.) Lewis acid equivalents were calculated with respect to the catalyst. Reaction quenched at 30 psi uptake or 1,800 seconds, whichever condition was first met.

| Run | Lewis acid (equiv) | 1-hexene (microliter) | quench time (s) | yield (mg) | activity (kg mol$^{-1}$ h$^{-1}$) | Temp (° C.) | $M_w$ (g/mol) | $M_n$ (g/mol) | Mw/Mn | Melting point (Tm, ° C.) |
|---|---|---|---|---|---|---|---|---|---|---|
| 1 | no | 0 | 1800 | 65.4 | 6,540 | 100 | 1,466,534 | 859,379 | 1.7 | 106.9 |
| 2 | Al1 (10) | 0 | 52 | 83.1 | 287,654 | 100 | 287,773 | 102,242 | 2.8 | 111 |
| 3 | Al1 (10) | 10 | 56 | 86.2 | 277,071 | 100 | 242,373 | 70,472 | 3.4 | 109.9 |
| 4 | Al1 (10) | 20 | 59 | 87.7 | 267,559 | 100 | 254,858 | 127,335 | 2.0 | 108.2 |
| 5 | Al1 (10) | 30 | 55 | 88.5 | 289,636 | 100 | 239,597 | 108,470 | 2.2 | 106.3 |
| 6 | Al1 (10) | 40 | 54 | 86.1 | 287,000 | 100 | 231,956 | 114,515 | 2.0 | 103.9 |
| 7 | Al1 (10) | 60 | 60 | 79.3 | 237,900 | 100 | 235,482 | 114,878 | 2.0 | 100.3 |
| 8 | Al1 (10) | 80 | 57 | 84.0 | 265,263 | 100 | 226,144 | 109,447 | 2.1 | 96.7 |
| 9 | Al1 (10) | 100 | 63 | 79.5 | 227,143 | 100 | 220,329 | 105,695 | 2.1 | 93.5 |
| 10 | Al1 (10) | 120 | 58 | 74.4 | 230,897 | 100 | 212,995 | 112,357 | 1.9 | 92.2 |
| 11 | no | 0 | 1562 | 0.0415 | 4,782 | 70 | 3,189,125 | 1,647,593 | 1.9 | 126.9 |
| 12 | Al1 (10) | 0 | 91 | 0.114 | 225,495 | 70 | 1,209,277 | 176,803 | 6.8 | 118.8 |
| 13 | Al1 (10) | 10 | 332 | 0.1313 | 71,187 | 70 | 723,815 | 104,183 | 6.9 | 116.8 |
| 14 | Al1 (10) | 20 | 351 | 0.1362 | 69,846 | 70 | 721,179 | 220,462 | 3.3 | 116.1 |
| 15 | Al1 (10) | 30 | 323 | 0.1346 | 75,009 | 70 | 582,688 | 152,532 | 3.8 | 113.5 |
| 16 | Al1 (10) | 40 | 312 | 0.1368 | 78,923 | 70 | 584,548 | 159,250 | 3.7 | 113.1 |
| 17 | Al1 (10) | 60 | 375 | 0.1383 | 66,384 | 70 | 489,668 | 131,749 | 3.7 | 109.7 |
| 18 | Al1 (10) | 80 | 919 | 0.1504 | 29,458 | 70 | 424,842 | 111,007 | 3.8 | 107.4 |
| 19 | Al1 (10) | 100 | 870 | 0.1484 | 30,703 | 70 | 391,187 | 76,865 | 5.1 | 105.1 |
| 20 | Al1 (10) | 120 | 641 | 0.1469 | 41,251 | 70 | 422,978 | 136,201 | 3.1 | 102.8 |

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with an IR detector and calibrated using polystyrene standards (Polymer Laboratories: Polystyrene Calibration Kit S-M-10: Mp (peak Mw) between 5,000 and 3,390,000). Samples (250 μL of a polymer solution in TCB were injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

For ethylene 1-hexene copolymers, the melt points decrease with increasing amounts of 1-hexene, in line with incorporation of 1-hexene.

Overall, catalyst systems and processes of the present disclosure can provide high temperature ethylene polymerization, propylene polymerization, or copolymerization with good activity. It has been discovered that amido-benzoquinone late transition metal compounds (groups 8-10) activated with Lewis acids can polymerize olefins with improved activity over previous polymerization reactions using late transition metals. Furthermore, the catalyst systems described may involve less activator (e.g., a Lewis Acid) than previous late transition metal catalyst systems. The catalyst systems can provide formation of polymers having high molecular weights and the ability to make an increased amount of polymer in a given reactor, as compared to conventional catalysts. Hence, the present disclosure demonstrates highly active catalysts capable of operating at high reactor temperatures with reduced quantities of activator while producing polymers with controlled molecular weights. Furthermore, in the presence of Lewis acids, catalysts of the present disclosure may produce polymers with lower melting points.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", selected from the group of "consisting of" or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst system comprising a catalyst compound and an activator, wherein the catalyst compound is represented by Formula (I):

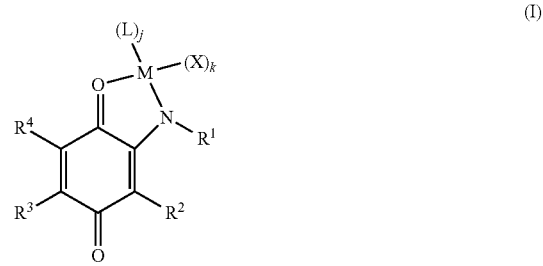

wherein:
M is a group 8, 9, or 10 transition metal;
L is a Lewis base;
j is 0, 1, or 2;
X is an anionic ligand;
k is 0, 1, or 2; and
$R^1$, $R^2$, $R^3$, and $R^4$ are independently selected from hydrogen, substituted or unsubstituted $C_1$-$C_{30}$ hydrocarbyl, —CN, —NR'$_2$, —OR', halogen, —NO$_2$, —SiR'$_3$, five-, six-, or seven-membered heterocyclyl (where each R' is independently hydrogen, $C_1$-$C_{30}$ hydrocarbyl, and R' is optionally substituted by halogen, or two R' radicals optionally bond to form a five- or six-membered ring), or —SiR''$_3$, —SiR''$_2$(OR'''), —SiR''(OR''')$_2$, or —Si(OR''')$_3$ (where each R'' and R' is independently hydrogen, $C_1$-$C_{30}$ hydrocarbyl, or two R'' radicals optionally bond to form a five- or six-membered ring);
where $R^1$, $R^2$, $R^3$, and $R^4$ are optionally substituted by halogen, —NO$_2$, —CN, —CF$_3$, —CF$_2$CF$_3$, —CH$_2$CF$_3$, —NR'$_2$, —OR', —OSi(OR')$_3$, where each R' is independently hydrogen, $C_1$-$C_{30}$ hydrocarbyl, and R' is optionally substituted by halogen, or two R' radicals optionally bond to form a five- or six-membered ring, or —SiR''$_3$ where each R'' is independently hydrogen, $C_1$-$C_{30}$ hydrocarbyl, or two R'' radicals optionally bond to form a five- or six-membered ring; and
the activator is represented by the Formula (II):

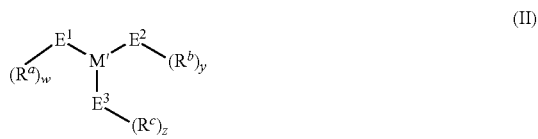

wherein:
M' is selected from boron, aluminum, or gallium;
$E^1$, $E^2$, and $E^3$ are oxygen;
$R^a$, $R^b$, and $R^c$ are independently a $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 30 carbon atoms, alkylaryl where alkyl has from 1 to 10 carbon atoms and aryl has from 6 to 30 carbon atoms, a support material, or two or more of $R^a$, $R^b$, and $R^c$ are optionally bonded to form a five-, six- or seven-membered carbocyclic or heterocyclic ring, the heterocyclic ring being at least one atom selected from the group consisting of N, P, O and S;
where $R^a$, $R^b$, and $R^c$ are optionally substituted by halogen, —$NO_2$, —$CF_3$, —$CF_2CF_3$, —$CH_2CF_3$, —$NR'_2$, —$OR'$(where each R' is independently hydrogen, $C_1$-$C_{22}$-hydrocarbyl, and R' is optionally substituted by halogen, or two R' radicals optionally bond to form a five- or six-membered ring), or —$SiR''_3$ (where each R" is independently hydrogen, $C_1$-$C_{22}$-hydrocarbyl, or two R" radicals optionally bond to form a five- or six-membered ring);
w is 1;
y is 1; and
z is 1.

2. The catalyst system of claim 1, wherein M is selected from Ni, Fe, or Co.

3. The catalyst system of claim 1, wherein M is Ni.

4. The catalyst system of claim 1, wherein X is selected from a halogen, alkoxy, methyl, ethyl, propyl, benzyl, phenyl, or naphthyl.

5. The catalyst system of claim 1, wherein X is a phenyl.

6. The catalyst system of claim 1, wherein L is an imine, an amine, a phosphine, a nitrile, an ether, a thioether, a sulfoxide, or a carbene.

7. The catalyst system of claim 1, wherein L is a phosphine.

8. The catalyst system of claim 1, wherein L is triphenylphosphine.

9. The catalyst system of claim 1, wherein $R^3$ and $R^4$ together form an aryl.

10. The catalyst system of claim 1, wherein $R^1$ is an aryl.

11. The catalyst system of claim 1, wherein $R^1$ comprises a 2,6-substituted aryl.

12. The catalyst system of claim 11, wherein the 2,6 substituted aryl is a 2,4,6-substituted aryl.

13. The catalyst system of claim 1, wherein $R^1$ is 2,6-(diphenylmethyl)-4-methylphenyl.

14. The catalyst system of claim 1, wherein $R^2$ is a hydrogen.

15. The catalyst system of claim 1, wherein M' is aluminum.

16. The catalyst system of claim 1, wherein the catalyst represented by Formula (I) is one of the following:

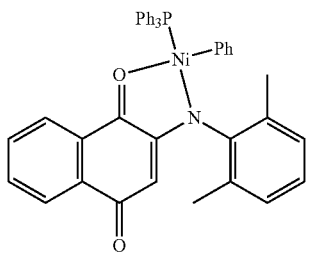

1

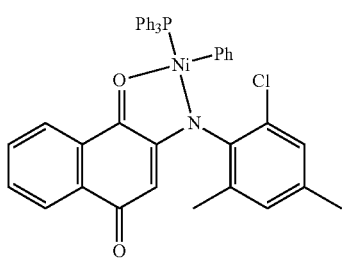

2

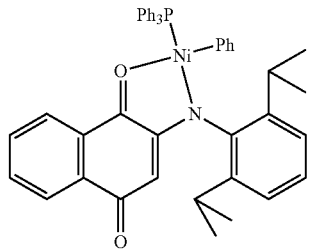

3

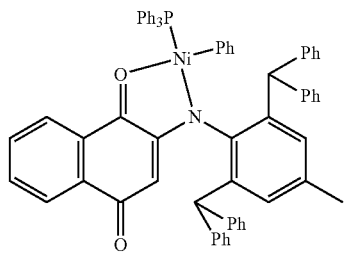

4

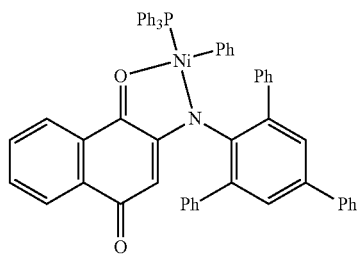

5

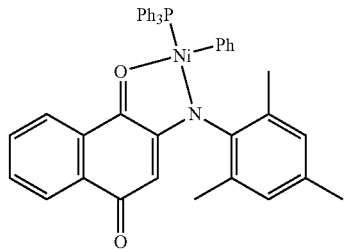

6

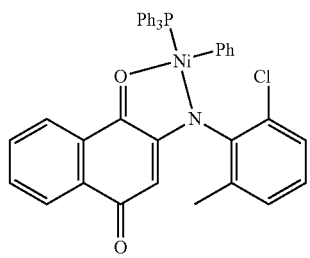

7

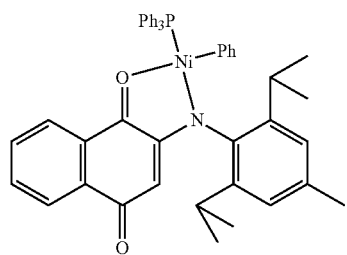
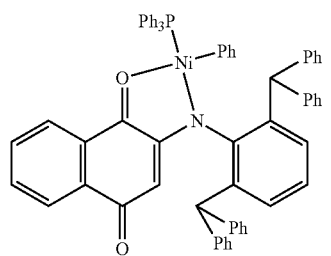
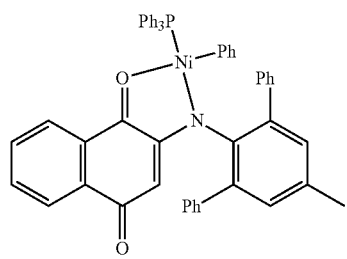
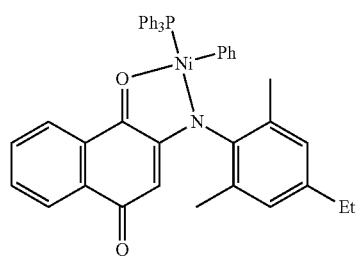
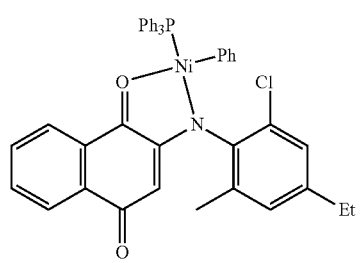
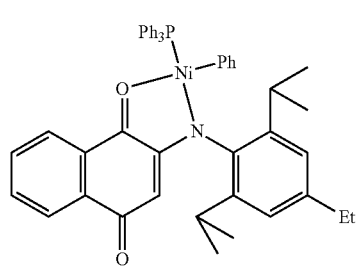
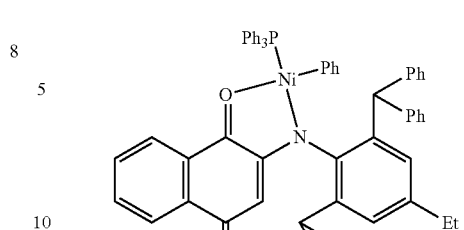
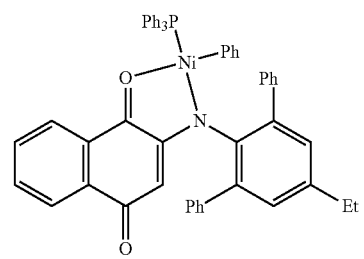
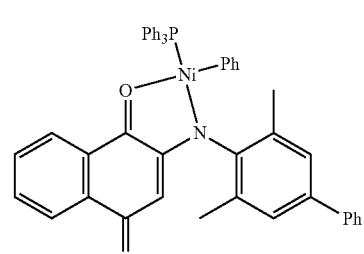
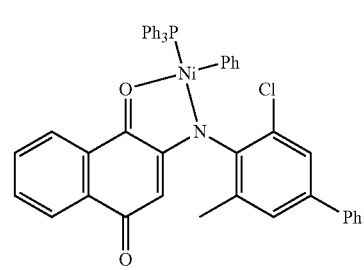
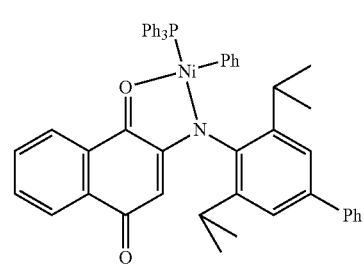
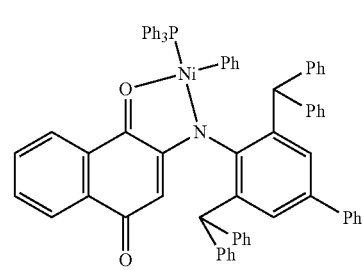

20
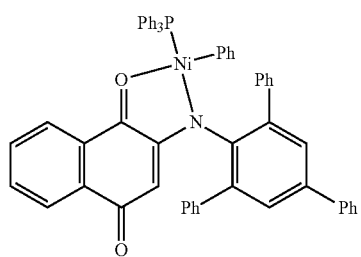
21
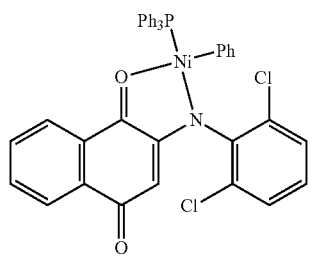
22
23
24
25
26
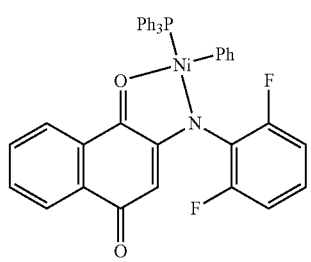
27
28
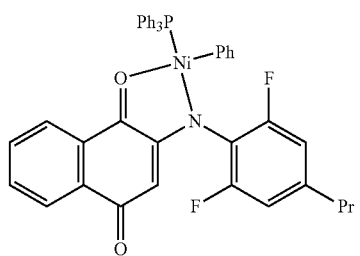
29
30
31
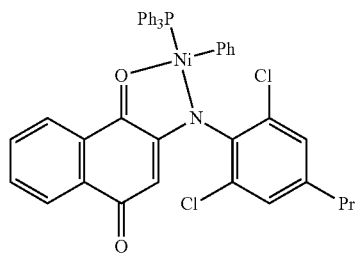
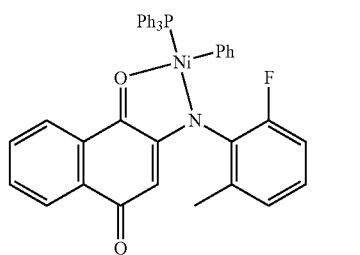

-continued

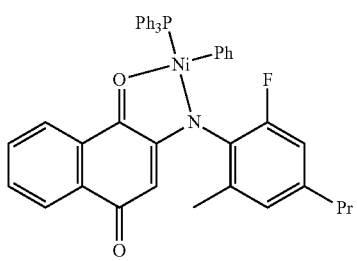
32

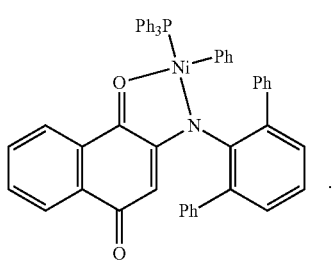
33

17. The catalyst system of claim 1, wherein the catalyst represented by Formula (I) is selected from:

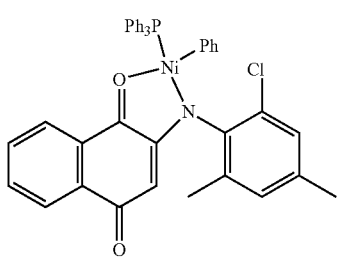
1

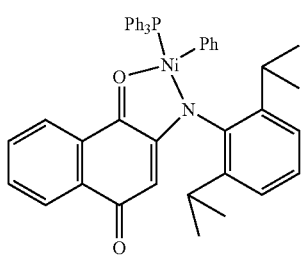
2

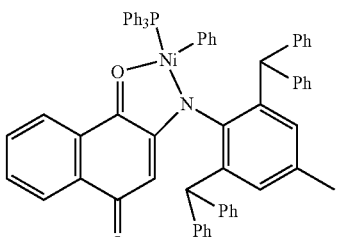
4

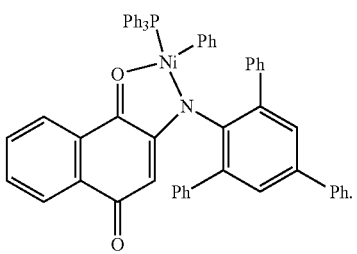
5

18. The catalyst system of claim 1, wherein the catalyst represented by Formula (I) is one of the following:

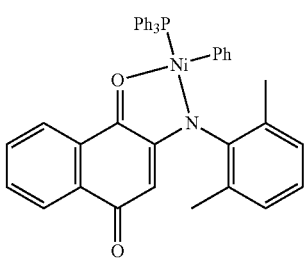
1

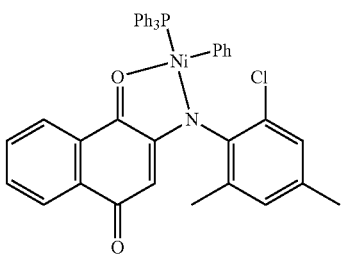
2

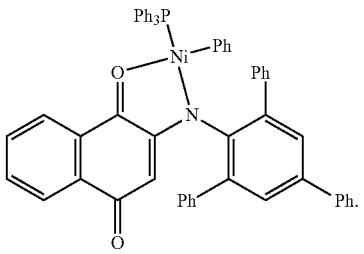
3

19. The catalyst system of claim 1, wherein $R^a$, $R^b$, and $R^c$ have the same chemical structure.

20. The catalyst system of claim 1, wherein $R^a$, $R^b$, and $R^c$ are perfluorophenyl.

21. The catalyst system of claim 1, wherein at least one of $R^a$, $R^b$, or $R^c$ silica or alumina.

22. The catalyst system of claim 1, further comprising a physical support material.

23. The catalyst system of claim 22, wherein the physical support material is $Al_2O_3$, $ZrO_2$, $SiO_2$, $TiO_2$, silica clay, silicon oxide/clay, or mixture(s) thereof.

24. A process for the production of an ethylene polymer comprising: polymerizing ethylene and optionally at least one $C_3$-$C_{20}$ alpha-olefin by contacting the ethylene and the optional $C_3$-$C_{20}$ alpha-olefin with the catalyst system of claim 1 in a gas phase reactor at a reactor pressure of from 0.7 to 70 bar and a reactor temperature of from 20° C. to 150° C. to form an ethylene polymer.

25. The process of claim 24, wherein the catalyst has a productivity from 5,000 $gPmmol^{-1}hr^{-1}$ to 100,000 $gPmmol^{-1}hr^{-1}$.

26. The process of claim 24, wherein the catalyst has an activity from 50,000 gP/mmolCat/hour to 300,000 gP/mmolCat/hour.

27. The catalyst system of claim 1, wherein the activator is one or more of

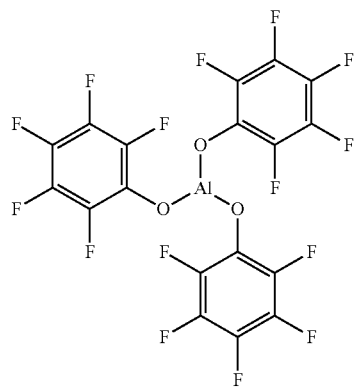

A1

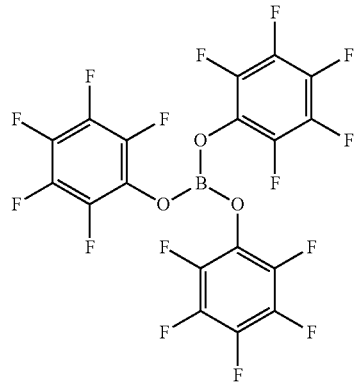

A2

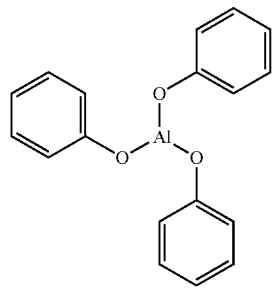

A3

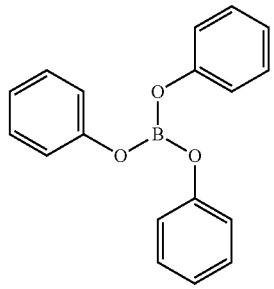

A4

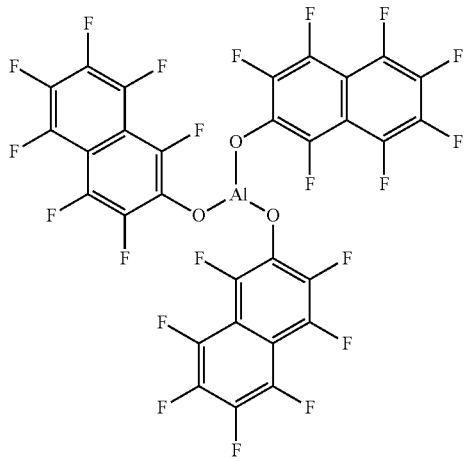

A5

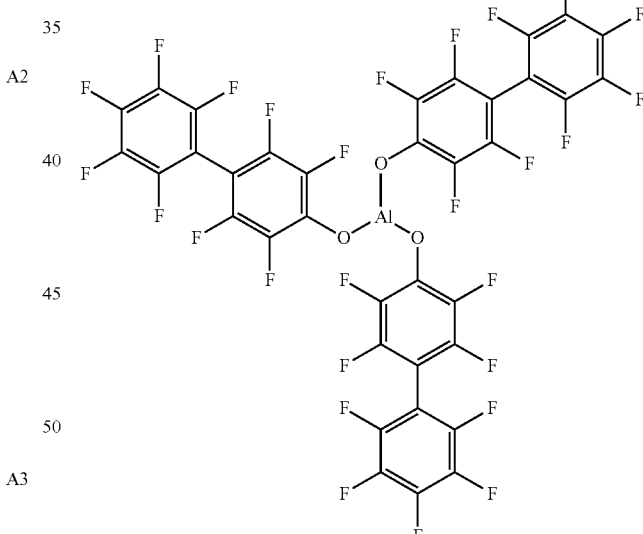

A6

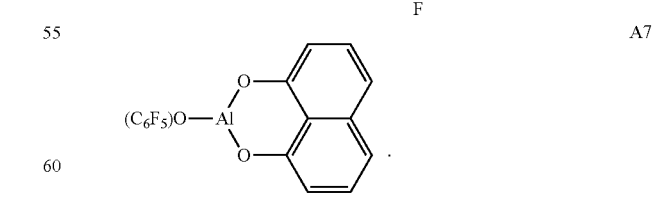

A7

* * * * *